US009225024B2

(12) United States Patent
Mohanram et al.

(10) Patent No.: US 9,225,024 B2
(45) Date of Patent: Dec. 29, 2015

(54) HIGHLY SINTERABLE LANTHANUM STRONTIUM TITANATE INTERCONNECTS THROUGH DOPING

(75) Inventors: Aravind Mohanram, Shrewsbury, MA (US); Yeshwanth Narendar, Westford, MA (US); Guangyong Lin, Shrewsbury, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 429 days.

(21) Appl. No.: 12/640,903

(22) Filed: Dec. 17, 2009

(65) Prior Publication Data

US 2010/0183947 A1  Jul. 22, 2010

Related U.S. Application Data

(60) Provisional application No. 61/203,073, filed on Dec. 18, 2008.

(51) Int. Cl.
*C04B 35/47* (2006.01)
*H01M 8/10* (2006.01)
(Continued)

(52) U.S. Cl.
CPC ............. *H01M 8/0217* (2013.01); *C04B 35/47* (2013.01); *C04B 35/6261* (2013.01); *C04B 2235/3227* (2013.01); *C04B 2235/3251* (2013.01); *C04B 2235/3258* (2013.01); *C04B 2235/3265* (2013.01); *C04B 2235/3272* (2013.01); *C04B 2235/3275* (2013.01);
(Continued)

(58) Field of Classification Search
USPC .......... 429/495, 32, 12; 361/321.4; 252/521.1
See application file for complete search history.

(56) References Cited

U.S. PATENT DOCUMENTS 4,830,780 A * 5/1989 Olson et al. ............... 252/519.1
4,883,497 A   11/1989 Claar et al.
(Continued)

FOREIGN PATENT DOCUMENTS

CN   101002355 A   7/2007
EP   0 896 378 A1   2/1999
(Continued)

OTHER PUBLICATIONS

Juan Carlos Ruiz-Morales, Jesús Canales-Vázquez, Cristian Savaniu, David Marrero-López, Wuzong Zhou, and John T. S. Irvine, "Disruption of extended defects in solid oxide fuel cell anodes for methane oxidation" Nature, vol. 439, pp. 568-571 (Feb. 2, 2006).*
(Continued)

*Primary Examiner* — Ula C Ruddock
*Assistant Examiner* — Osei Amponsah
(74) *Attorney, Agent, or Firm* — Abel Law Group, LLP; Thomas Osborn

(57) ABSTRACT

An interconnect material is formed by combining a lanthanum-doped strontium titanate with an aliovalent transition metal to form a precursor composition and sintering the precursor composition to form the interconnect material. The aliovalent transition metal can be an electron-acceptor dopant, such as manganese, cobalt, nickel or iron, or the aliovalent transition metal can be an electron-donor dopant, such as niobium or tungsten. A solid oxide fuel cell, or a strontium titanate varistor, or a strontium titanate capacitor can include the interconnect material that includes a lanthanum-doped strontium titanate that is further doped with an aliovalent transition metal.

17 Claims, 25 Drawing Sheets

(51) Int. Cl.
*H01C 7/10* (2006.01)
*H01G 4/06* (2006.01)
*H01M 8/02* (2006.01)
*C04B 35/626* (2006.01)
*H01M 8/12* (2006.01)

(52) U.S. Cl.
CPC ............. C04B 2235/3279 (2013.01); C04B 2235/5409 (2013.01); C04B 2235/5445 (2013.01); C04B 2235/6582 (2013.01); C04B 2235/664 (2013.01); C04B 2235/77 (2013.01); C04B 2235/9607 (2013.01); C04B 2235/9615 (2013.01); H01M 2008/1293 (2013.01); Y02E 60/50 (2013.01); Y02E 60/525 (2013.01)

(56) References Cited

U.S. PATENT DOCUMENTS

| | | | |
|---|---|---|---|
| 4,913,982 A * | 4/1990 | Kotchick et al. | 429/535 |
| 5,356,730 A | 10/1994 | Minh et al. | |
| 5,496,655 A | 3/1996 | Lessing | |
| 5,807,642 A | 9/1998 | Xue et al. | |
| 5,922,486 A | 7/1999 | Chiao | |
| 6,051,330 A | 4/2000 | Fasano et al. | |
| 6,106,967 A | 8/2000 | Virkar et al. | |
| 6,168,745 B1 | 1/2001 | Jue et al. | |
| 6,228,520 B1 | 5/2001 | Chiao | |
| 6,428,920 B1 | 8/2002 | Badding et al. | |
| 6,558,831 B1 | 5/2003 | Doshi et al. | |
| 6,737,182 B2 | 5/2004 | Keegan | |
| 6,949,307 B2 | 9/2005 | Cable et al. | |
| 7,990,678 B2 * | 8/2011 | Kawamoto et al. | 361/321.4 |
| 8,455,154 B2 | 6/2013 | Kwon et al. | |
| 2001/0044043 A1 | 11/2001 | Badding et al. | |
| 2003/0175573 A1 | 9/2003 | Yoo et al. | |
| 2004/0001994 A1 | 1/2004 | Marina et al. | |
| 2004/0001995 A1 | 1/2004 | Furuya et al. | |
| 2004/0018409 A1 | 1/2004 | Hui et al. | |
| 2005/0053819 A1 * | 3/2005 | Paz | 429/32 |
| 2005/0221138 A1 * | 10/2005 | Chinchure et al. | 429/32 |
| 2005/0227134 A1 | 10/2005 | Nguyen | |
| 2006/0147778 A1 | 7/2006 | Matsuzaki et al. | |
| 2007/0009784 A1 | 1/2007 | Pal et al. | |
| 2007/0015045 A1 | 1/2007 | Lee et al. | |
| 2007/0037031 A1 | 2/2007 | Cassidy et al. | |
| 2007/0237999 A1 | 10/2007 | Donahue et al. | |
| 2008/0081223 A1 * | 4/2008 | Yasumoto et al. | 429/12 |
| 2010/0003557 A1 | 1/2010 | Demin et al. | |
| 2010/0178589 A1 | 7/2010 | Kwon et al. | |
| 2010/0183947 A1 | 7/2010 | Mohanram et al. | |
| 2010/0209802 A1 | 8/2010 | Armstrong et al. | |
| 2010/0297534 A1 | 11/2010 | Ketcham et al. | |
| 2013/0177831 A1 | 7/2013 | Lin et al. | |

FOREIGN PATENT DOCUMENTS

| | | | | |
|---|---|---|---|---|
| EP | 1 603 183 A1 | 12/2005 | | |
| EP | 1 788 653 A1 | 5/2007 | | |
| EP | 2273598 A1 | 1/2011 | | |
| JP | 62-235214 A | 10/1987 | | |
| JP | H0439866 A | 2/1992 | | |
| JP | H05186277 A | 7/1993 | | |
| JP | 06-044991 | 2/1994 | | |
| JP | 06-224006 | 8/1994 | | |
| JP | H1064565 A | 3/1998 | | |
| JP | 200115129 | 1/2001 | | |
| JP | 2001-052725 A | 2/2001 | | |
| JP | 2003-288919 | * 10/2003 | ............ | H01M 8/02 |
| JP | 2003288919 A | * 10/2003 | ............ | H01M 8/02 |
| JP | 2003-323906 A | 11/2003 | | |
| JP | 2007-180297 | 7/2007 | | |
| JP | 2008-041468 A | 2/2008 | | |
| JP | 2008041469 A | 2/2008 | | |
| WO | 02/29917 A1 | 4/2002 | | |
| WO | WO 02/41434 A1 | 5/2002 | | |
| WO | WO 2004/082058 | 9/2004 | | |
| WO | 2006/016627 A1 | 2/2006 | | |
| WO | WO 2006/016628 A1 | 2/2006 | | |
| WO | WO 2007/074635 A1 * | 7/2007 | ............ | H01G 4/06 |
| WO | 2008/004389 A1 | 1/2008 | | |
| WO | 2008/085488 A1 | 7/2008 | | |
| WO | 2009/085143 A1 | 7/2009 | | |
| WO | 2010078359 A1 | 7/2010 | | |

OTHER PUBLICATIONS

Nguyen Q. Minh, Ceramic Fuel Cells, J. Am. Ceramic Soc. 76[3] (1993), published online Mar. 8, 2005, pp. 563-588.*
English Translation of Sugita et al. "JP 2003-288919, published Oct. 2003".*
Minh et al., Ceramic Fuel Cells, J. Am. Ceramic Soc. 76[3] (1993), published online Mar. 8, 2005, pp. 563-588.*
Transmittal of International Preliminary Report on Patentability, International Application No. PCT/US2009/068509 mailed on Jun. 30, 2011.
Canales-Vázquez, J., et al., "Electrical Properties in La2Sr4Ti6O19-δ; a potential anode for high temperature fuel cells," Solid State Ionics, 159:159-165 (2003).
Carter, J. D., et al., "Reactions at the Calcium Doped Lanthanum Chromite-Yttria Stabilized Zirconia Interface," J. Solid State Chem., 122, Art. No. 0134, pp. 407-415 (1996).
Chick, L. A., et al., "Phase Transitions and Transient Liquid-Phase Sintering in Calcium-Substituted Lanthanum Chromite," J. Am. Ceram. Soc., 80(8):2109-2120 (1997).
Fergus, J. W., "Lanthanum Chromite-Based Materials for Solid Oxide Fuel Cell Interconnects," Solid State Ionics, 171:1-15 (2004).
Fu, Q. X., et al., "La0.4Sr0.6Ti1-χMnχO3-δ Perovskites as Anode Materials for Solid Oxide Fuel Cells," J. Electrochem. Soc. 153(4):D74-D83 (2006).
Fujita, K., et al., "Relationship Between Electrochemical Properties of SOFC Cathode and Composition of Oxide Layer Formed on Metallic Interconnects," J. Power Sources 131:270-277 (2004).
Ghosh, S., et al., "Synthesis of La0.7Ca0.3CrO3 SOFC Interconnect Using a Chromium Source," Electrochem. and Solid-State Ltrs, 9(11):A516-A519 (2006).
Horikiri, F., et al., "Electrical Properties of Nb-Doped SrTiO3 Ceramics with Excess TiO2 for SOFC Anodes and Interconnects," Journal of Electrochemical Society, 155(1): B16-B20 (2008).
Huang, W. and Gopalan, S., "Bi-layer Structures as Solid Oxide Fuel Cell Interconnections," J. Power Sources 154:180-183 (2006).
Hui, S. and Petrie, A., "Electrical Conductivity of Yttrium-doped SrTiO3: Influence of Transition Metal Additives," Materials and Research Bulletin 37:1215-1231 (2002).
Hui, S. and Petrie, A., "Electrical Properties of Yttrium-Doped Strontium Titanate Under Reducing Conditions," J. Electrochem. Soc., 149(1):J1-J10 (2002).
Hui; S. and Petrie, A., "Evaluation of Yttrium-Doped SrTiO3 as an Anode for Solid Oxide Fuel Cells," J. Euro.Ceram. Soc., 22:1673-1681 (2002).
Kawada, T., et al., "Fabrication of a Planar Solid Oxide Fuel Cell by Tape-Casting and Co-Firing Method," J. Ceramic Soc. of Japan, 100(60):847-850 (1992). (English Abstract).
Kolodiazhnyi, T. and Petrie, A., "The Applicability of Sr-deficient n-type SrTiO3 for SOFC Anodes," Journal of Electroceramics, 15:5-11 (2005).
Liu, Z., et al., "Planar SOFC Stack with Low-Cost Muti-Layer Ceramic Interconnect," International Symposium on Solid Oxide Fuel Cells No. 9, vol. 7 (2). Quebec, Canada (May 2005).
Minh, N. Q., et al., "Fabrication and Characterization of Monolithic Solid Oxide Fuel Cells," IN:IECEC-90; Proceedings of the 25th Intersociety Energy Conversion Engineering Conference, Reno, NV, vol. 3, pp. 230-234.
Murphy, M. W., et al., "Tape Casting of Lanthanum Chromite," J. Am Ceram. Soc., 80(1):165-170 (1997).
Notification of Transmittal of the International Search Report and the Written Opinion of the International Searching Authority, or the Declaration, for PCT/US2009/068509 (9 pp.) mailed Jul. 14, 2010.

(56) References Cited

OTHER PUBLICATIONS

Raymond, M. V., and Amarakoon, V.R.W., "Microstructure and Electrical Properties of Chemically Prepared Nb2O5-Doped SrTio3 Ceramics," J. Am. Ceram. Soc., 73(5):1308-1311 (1990).

Sakai, N., et al., "Lanthanum Chromite-Based Interconnects as Key Materials for SOFC Stack Development," Int. J. Appl. Ceram. Technol.,1(1):23-30 (2004).

Sakai, N., et al., "Sinterability and Electrical Conductivity of Calcium-Doped Lanthanum Chromites," J. Mater. Sci., 25:4531-4534 (1990).

Simner, S. P., et al., "Development of Lanthanum Ferrite SOFc Cathodes," J. Power Sources 113:1-10 (2003).

Simner, S.P., et al., "SOFC Performance with Fe-Cr-Mn Alloy Interconnect," J. Electrochem. Soc., 152(4):A740-A745 (2005).

Singhal, S. C. and Kendall, K., "Introduction to SOFCs." in High Temperature Solid Oxide Fuel Cells: Fundamentals, Design and Applications,Singhal & Kendall, eds. (UK:Elsevier Advanced Technology), Ch. 1 pp. 1-22.

Slater, P.R., et al., "Synthesis and Electrical Characterization of Doped Perovskite Titanates as Potential Anode Materials for Solid Oxide Fuel Cells," J. Mater. Chem., 7(12): 2495-3498 (1997).

Wincewicz, K. C. and Cooper, J. S., "Taxonomies of SOFC Material and Manufacturing Alternatives," J. Power Sources, 140:280-296 (2005).

Yang, Z., "Recent Advances in Metallic Interconnects for Solid Oxide Fuel Cells," International Materials Review, 53(1): 39-54 (2008).

Zhong, Z., "Stoichiometric Lanthanum Chromite Based Ceramic Interconnects with Low Sintering Temperature," Solid State Ionics 177:757-764 (2006).

Zhou, X., et al., "Preparation and Properties of Ceramic Interconnecting Materials, La0.7Ca0.3Cr3-$\delta$ Doped with GDC for IT-SOFCS," J. Power Sources, 162:279-285 (2006).

Zhu, W.Z., et al., "Development of interconnect materials for solid oxide fuel cells," Materials Science andEngineering A348, pp. 227-243 (2003).

International Search Report for PCT/2012/071227, dated Apr. 25, 2013, 2 pages.

Singh, Prakash et al., "Electrical conduction behavior of La and Mn substituted strontium titanate," Journal of Applied Physics, American Institute of Physics, New York, US, vol. 99, No. 12, Jun. 20, 2006.

* cited by examiner

HIGHLY SINTERABLE LANTHANUM STRONTIUM TITANATE INTERCONNECTS THROUGH DOPING

RELATED APPLICATION

This application claims the benefit of U.S. Provisional Application No. 61/203,073, filed on Dec. 18, 2008. The entire teachings of the above application are incorporated herein by reference.

BACKGROUND OF THE INVENTION

A fuel cell is a device that generates electricity by a chemical reaction. Among various fuel cells, solid oxide fuel cells use a hard, ceramic compound metal (e.g., calcium or zirconium) oxide as an electrolyte. Typically, in solid oxide fuel cells, an oxygen gas, such as $O_2$, is reduced to oxygen ions ($O^{2-}$) at the cathode, and a fuel gas, such as $H_2$ gas, is oxidized with the oxygen ions to form water at the anode. Fuel cells are generally designed as stacks, whereby subassemblies, each including a cathode, an anode and a solid electrolyte between the cathode and the anode, are assembled in series by locating an electrical interconnect between the cathode of one subassembly and the anode of another.

A major materials challenge in solid oxide fuel cell (SOFC) development is the interconnect material, which provides the conductive path for electrical current to pass between the electrodes and to the external circuit. The interconnect also acts as a separator plate, physically separating the fuel in the anode cavity from the air or oxygen in the cathode cavity. Therefore, the interconnect material must have good electrical conductivity to minimize resistive losses and must be stable in both oxidizing and reducing conditions. SOFCs operate at high temperatures, and therefore the coefficient of thermal expansion (CTE) of the interconnect material must be close to those of the other cell components in order to minimize thermal stresses. Other requirements of interconnect materials include adequate mechanical strength, relatively low permeability to oxygen and hydrogen, and reasonable thermal conductivity. Jeffrey W. Fergus, *Lanthanum chromite-based materials for solid oxide fuel cell interconnects*, Solid State Ionics, 171 pp. 1-15 (2004); Zhenguo Yang, *Recent advances in metallic interconnects for solid oxide fuel cells*, International Materials Reviews, 53[1] pp. 39-54 (2008).

There are two approaches, in general, to developing interconnect materials for SOFCs: metallic and ceramic, each of which offers different advantages and challenges. Metallic interconnects have good electrical conductivity, but are not stable when exposed to the oxidizing conditions at the cathode of SOFCs, so that coating of the surface with a conductive oxide (such as spinels) is usually required. Ceramic interconnect materials are oxides, and are thus stable in oxidizing atmospheres, but typically have lower electrical conductivities as compared to metals. High cost of the raw materials and fabrication difficulties in obtaining high density are some other issues related to ceramic interconnects which have hindered their application in SOFCs.

Lanthanum-doped strontium titanates (LST) are promising interconnect materials with good chemical and dimensional stability in reducing environments, low oxygen ion mobility and acceptably low resistance when used as thin layers. They also exhibit good compatibility with both cathode and anode materials without formation of deleterious second phases. However, sinterability typically is a limitation when co-firing with yttria-stabilized zirconia (8 mol % YSZ) electrolytes. Currently, LST materials generally need to be sintered at 1,460-1,500° C. to enable complete densification, while YSZ (such as, for example, TZ-8Y from Tosoh (Tosoh USA, Grove City, Ohio)) can be sintered to full density at 1,350° C. Therefore, LST materials generally need to be modified either physically or chemically to improve their sinterability to enable co-firing with YSZ electrolyte.

SUMMARY OF THE INVENTION

This invention generally is directed to a method of forming an interconnect material, the interconnect material formed, and to a solid oxide fuel cell that includes the interconnect material of the invention. The invention is also directed to a strontium titanate varistor and a strontium titanate capacitor that includes an interconnect material of the invention.

In one embodiment, a method of forming an interconnect material includes the steps of combining a lanthanum-doped strontium titanate with an aliovalent transition metal to form a precursor composition and sintering the precursor composition to form the interconnect material. In certain embodiments, the amount of aliovalent transition metal present in the precursor composition is sufficient to cause the precursor composition to sinter at a temperature in a range of between about 1,100° C. and about 1,500° C. The amount of aliovalent transition metal present in the precursor composition can be in a range of between about 1 mol % and about 8 mol %. In some embodiments, the aliovalent transition metal can be an electron-acceptor dopant. In those specific embodiments, the aliovalent transition metal can be at least one member selected from the group consisting of manganese, nickel, cobalt and iron. In other embodiments, the aliovalent transition metal can be an electron-donor dopant. In those specific embodiments, the aliovalent transition metal can be at least one member selected from the group consisting of niobium and tungsten. In certain embodiments, the amount of aliovalent transition metal present in the precursor composition is sufficient to cause the precursor composition to be sintered to full density at a temperature in a range of between about 1,200° C. and about 1,350° C. In another embodiment, the method of forming an interconnect material further includes the step of combining the precursor composition with at least one of a precursor cathode or anode layer of a solid oxide fuel cell prior to sintering the precursor composition.

In yet another embodiment, the invention is directed to an interconnect material comprising a lanthanum-doped strontium titanate that is further doped with an aliovalent transition metal.

In still another embodiment, the invention is directed to a solid oxide fuel cell comprising a interconnect material, including a lanthanum-doped strontium titanate that is further doped with an aliovalent transition metal. In one embodiment, the interconnect material is adjacent an anode. Alternatively, the interconnect material can be adjacent a cathode. In certain embodiments, the solid oxide fuel cell further includes an interface layer between the interconnect material and either an anode or a cathode.

In other embodiments, the invention is directed to a strontium titanate varistor or a strontium titanate capacitor comprising an interconnect material including a lanthanum-doped strontium titanate that is further doped with an aliovalent transition metal.

This invention has many advantages, such as enabling co-firing of LST interconnects with YSZ electrolyte layers at a temperature in a range of between about 1,200° C. and about 1,350° C. in SOFC stack applications.

BRIEF DESCRIPTION OF THE DRAWINGS

The foregoing will be apparent from the following more particular description of example embodiments of the invention, as illustrated in the accompanying drawings. The drawings are not necessarily to scale, emphasis instead being placed upon illustrating embodiments of the present invention.

(FIG. 14A) pure LST28 powder; (FIG. 14B) 2 mol % $Mn_2O_3$+98 mol % LST28 powder mixture; (FIG. 14C) 4 mol % $Mn_2O_3$+96 mol % LST28 powder mixture; (FIG. 14D) 2 mol % $Nb_2O_5$+98 mol % LST28 powder mixture; (FIG. 14E) 6 mol % $Nb_2O_5$+94 mol % LST28 powder mixture.

(FIG. 15A) undoped LST28 (LSTM0.0); (FIG. 15B) 2 mol % $Mn_2O_3$ doped LST28 (LSTM2.0); (FIG. 15C) 4 mol % $Mn_2O_3$ doped LST28 (LSTM4.0); (FIG. 15D) 2 mol % $Nb_2O_5$ doped LST28 (LSTN2.0); (FIG. 15E) 6 mol % $Nb_2O_5$ doped LST28 (LSTN6.0). (FIG. 15F) 8 mol % $Nb_2O_5$ doped LST28 (LSTN8.0).

DETAILED DESCRIPTION OF THE INVENTION

Figure 1:
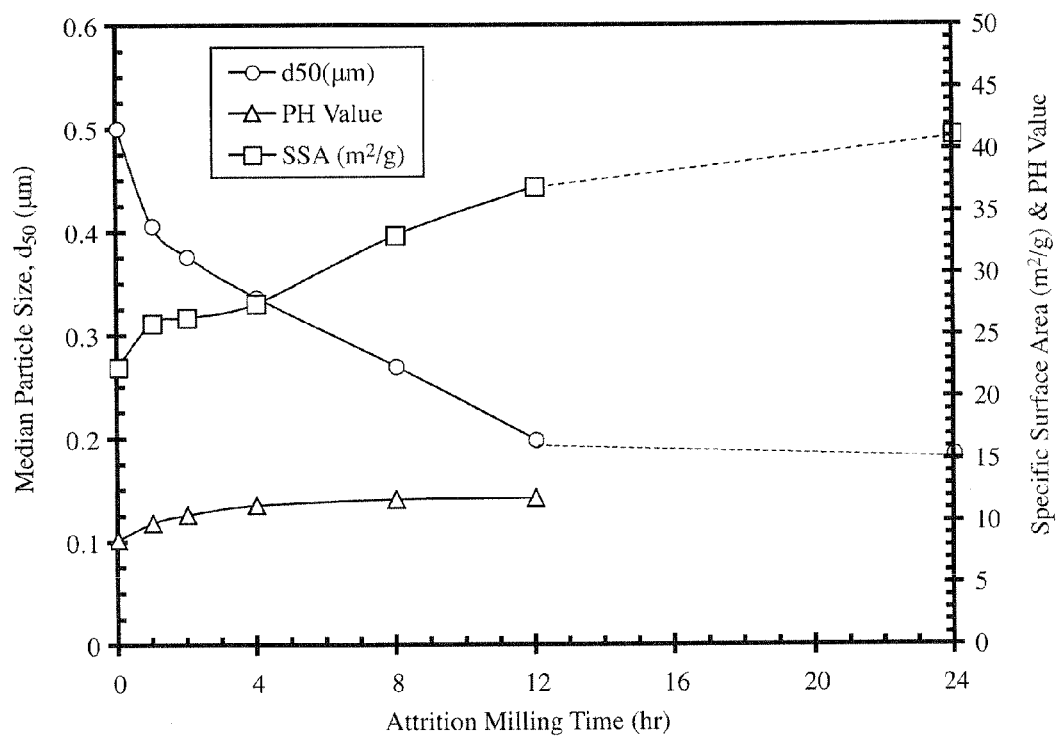
FIG. 1 is a graph of the median particle size ($d_{50}$), specific surface area, and pH value (of attrition milling solution) of LST28 powder after attrition milling.

This invention generally is directed to a method of reducing the sintering temperature and modifying the sintering behavior of a lanthanum-doped strontium titanate (LST) interconnect material. Methods employed by the method of the invention to reduce the sintering temperature of LST can include: (1) attrition milling (to reduce the particle size); (2) doping (to add one or two oxides to LST by a conventional ceramic process) such as (a) $Mn_2O_3$ doping and (b) $Nb_2O_5$ doping; and (3) using an A-site deficiency LST. An objective of the invention is to improve the sinterability of LST by $Mn_2O_3$- and $Nb_2O_5$-doping and/or milling—to reduce the $T_{peak}$>100° C. so as to get dense and crack free interconnects, and evaluate the effects of $Mn_2O_3$- and $Nb_2O_5$-doping on the electrical conductivity, the coefficient of thermal expansion (CTE), and chemical expansion in both oxidizing and reducing atmospheres. A-site deficient $La_{0.30}Sr_{0.55}TiO_3$ perovskite (LST355) was also evaluated as a candidate material for interconnects.

Without wishing to be bound by any particular theory, it is proposed that the addition of aliovalent transition metals as dopants that replace the Ti within the LST perovskite can help create vacancies and improve sinterability. For this purpose both acceptor dopants such as Mn, Ni, Co or Fe can be added, or donor dopants such as Nb or W can be used. To enhance the effect on sintering, the dopants can be either incorporated into the LST powder or added to the LST powder prior to sintering. An aliovalent transition metal dopant is a transition metal dopant with a different charge state than the ions of the host crystal. The amount of aliovalent transition metal present in the precursor composition is sufficient to cause the precursor composition to sinter at a temperature in a range of between about 1,100° C. and 1,500° C., more preferably in a range of between about 1100° C. and about 1,400° C., and most preferably in a range of between about 1,100° C. and about 1,250° C.

A fuel cell device with the doped LST materials can consist of LST material modified with aliovalent dopants, such as Mn, Ni, Co, Fe, Nb or W, as an interconnect layer or part of interconnect multilayer structure, where one layer is doped LST sandwiched between the cathode and anode layers with or without interface layers between the interconnect layer or layers and the cathode and anode.

Four kinds of powders, $La_{0.2}Sr_{0.8}TiO_{3-\delta}$ (LST28) and $La_{0.30}Sr_{0.55}TiO_{3-\delta}$ (LST355) from American Elements (Los Angeles, Calif.), $Nb_2O_5$, and $Mn_2O_3$ from Alfa Aesar (Ward Hill, Mass.) have been selected as the starting materials. The latter two oxides can be employed as the additives/dopants. Attrition milling, for example, can be employed to refine LST28, $Nb_2O_5$, and $Mn_2O_3$. The median particle size ($d_{50}$) of $Mn_2O_3$ can be reduced from as-received 4.0 μm to a $d_{50}$ in a range of between about 0.2 μm and about 0.5 μm after attrition milling for a time period in a range of between about 18 hours and about 48 hours, and the specific surface area (SSA) of $Mn_2O_3$ can be increased from as-received 1.04 $m^2$/g to a SSA in a range of between about 5 $m^2$/g and about 32 $m^2$/g at the same time. In a specific example, the $d_{50}$ of $Mn_2O_3$ was reduced to 0.2 μm, and the SSA of $Mn_2O_3$ was increased to 31.59 m²/g by attrition milling for about 24 hours. The $d_{50}$ and SSA of $Nb_2O_5$ can be changed from as-received 0.47 µm and 5.66 m²/g, respectively, to a $d_{50}$ in a range of between about 0.2 µm and about 0.5 µm and a SSA in a range of between about 5 m²/g and about 32 m²/g by attrition milling for a time period in a range of between about 18 hours and about 48 hours. In a specific example, the $d_{50}$ of $Nb_2O_5$ was reduced to 0.33 µm, and the SSA of $Nb_2O_5$ was increased to 11.88 m²/g by attrition milling for about 24 hours. Both attrition-milled $Mn_2O_3$ and $Nb_2O_5$ can be employed as the additives in doping LST28.

SEM and laser light scattering can be employed to characterize the as-received materials and those after attrition milling. The particle sizes can be obtained by laser scattering measurements with, for example, a Partica LA-950 laser from Horiba (Horiba Instruments, Inc., Irvine, Calif.). The LST28 and additive powders can be mixed by ball milling for 24 hrs with the additive up to 8 mol % using deionized (DI) water with 3 wt % of Darvan® C (R. T. Vanderbilt, Inc., Norwalk, Conn.) as the dispersant. A large ultrasonic probe can be employed for about 3 minutes at a power range of between about 40 W and about 65 W to improve the mixing of $Mn_2O_3$ or $Nb_2O_5$ and LST28 powders before ball milling. The sintering behaviors of the undoped and doped LST series can be studied by pressureless sintering and dilatometry. Densities of sintered LST samples can be measured by the Archimedes method well known in the art.

The electrical conductivities of selected compositions of the doped LST series can be measured in the sintered bar samples by a four-probe technique at 800, 900, and 1,000° C. in both air and forming gas (96% $N_2$+4% $H_2$). CTE and chemical expansion can also be measured with dilatometry using forming gas.

Exemplification

Reducing the Sintering Temperature of LST28
Attrition Milling

Figure 2:
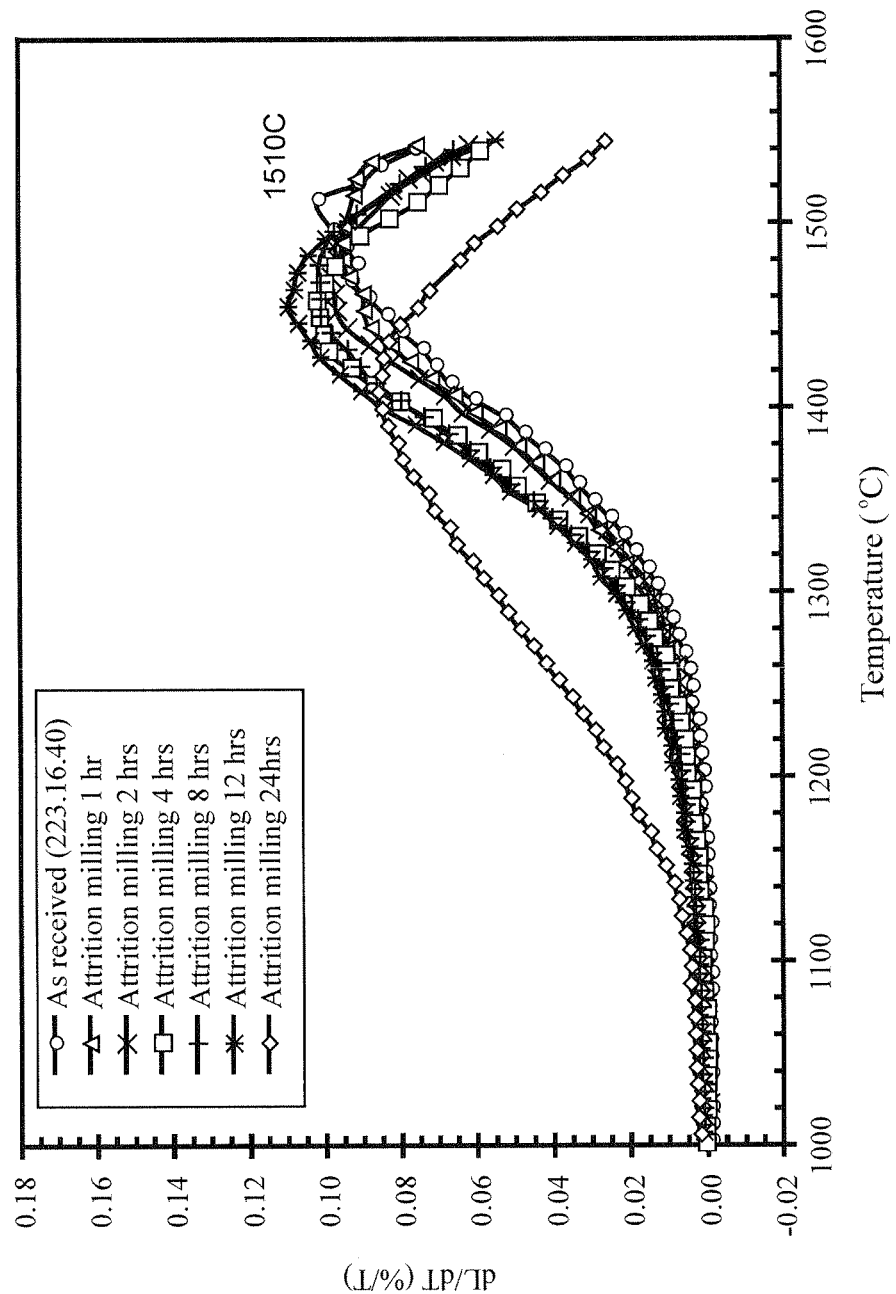
FIG. 2 is a graph of the shrinkage rate of LST28 after attrition milling as measured by dilatometry using water for mixing with binders.
Figure 3:
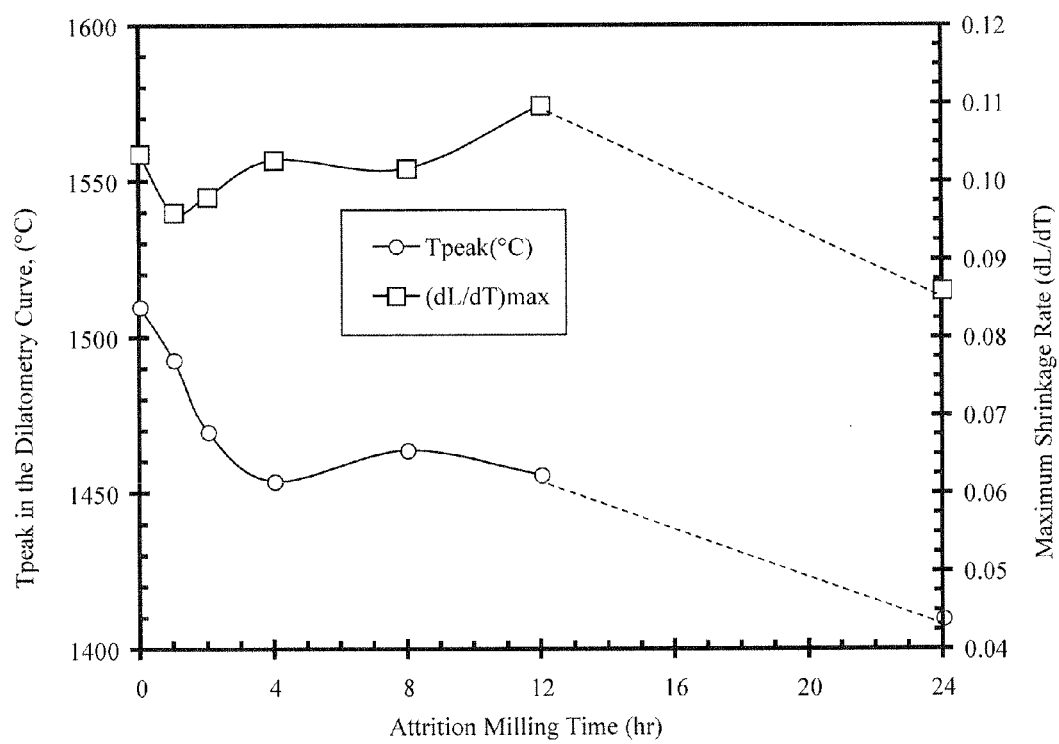
FIG. 3 is a graph of the peak temperatures and maximum shrinkage rates, $(dL/dT)_{max}$, of the attrition milled LST28 powder shrinkage curves shown in FIG. 2.

Attrition milling of LST28 powder was performed from 1 hr to 24 hrs, and the results of powder characterization and dilatometry are shown in FIGS. 1-3. As expected, the median particle size ($d_{50}$) decreased significantly from 0.5 µm to 0.20 µm, and SSA increased from 23 m²/g to 37 m²/g with attrition milling for 12 hrs. After attrition milling the LST powder up to 24 hrs, however, the median particle size ($d_{50}$) was only reduced from 0.20 µm to 0.19 µm, and the SSA was increased to 41 m²/g. Attrition milling more than 12 hrs under these conditions did not further refine the LST28 particles. FIG. 1 showed that the pH value of LST28 solution increased from 8.54 to 11.88, indicating that some phases had been changed during attrition milling. Inductively coupled plasma (ICP) results showed that only a 61 µg/ml Sr concentration was detected in the water (the total water was about 1.5 liters) used for attrition milling and washing milling media, but almost no La or Ti were found. The total Sr leached out during milling was about 0.1 g, which is negligible compared to 90 g Sr out of the 200 g LST powder in the batch and may not be able to explain the pH value change. Furthermore, XRD was not able identify any change in the phase structure attrition-milled LST28 powder. FIG. 2 shows the first derivative of the shrinkage curves as measured by dilatometry for the LST28 powders milled for various amounts of time. The peak temperatures, $T_{peak}$, and maximum shrinkage rates, $(dL/dT)_{max}$, from FIG. 2 are summarized in FIG. 3. The shrinkage curves shifted to slightly lower temperatures with attrition milling, as shown in FIG. 2. The $T_{peak}$ of LST28 powder decreased steadily in the first 4 hrs attrition milling, from 1,510° C. to 1,454° C., but did not decrease further by extending the milling time to 8 hrs or 12 hrs. The $T_{peak}$ of LST28 powder decreased from 1,510° C. to 1,410° C. after attrition milling for 24 hrs. Attrition milling 24 hrs also broadened the shrinkage curve of LST28 powder. The $(dL/dT)_{max}$ decreased after 1 hr attrition milling, then increased steadily with further milling up to 12 hrs. It is reasonable that finer powder started to sinter earlier (lower $T_{peak}$) and sintered faster (higher $(dL/dT)_{max}$), but it would be a challenge to cast a LST28 powder with a high specific surface area (SSA=41 m²/g). Based on the above attrition milling study, LST28 powder after 4 hrs milling ($d_{50}$=0.34 µm, SSA=28 m²/g) was selected as the baseline for $Mn_2O_3$ doping.

$Mn_2O_3$ Doped Attrition Milled and as-Received LST28

Figure 4:
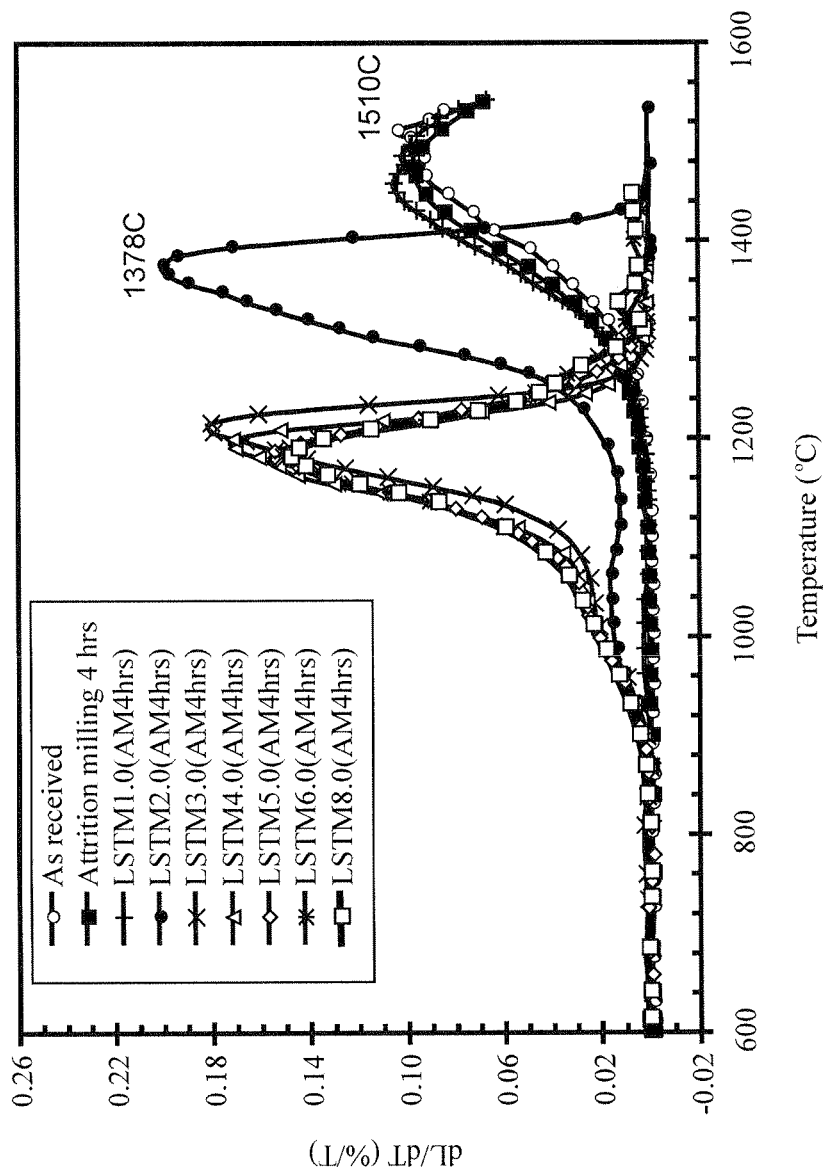
FIG. 4 is a graph of the shrinkage rate of LST28 after attrition milling and $Mn_2O_3$ doping as measured by dilatometry.
Figure 5:
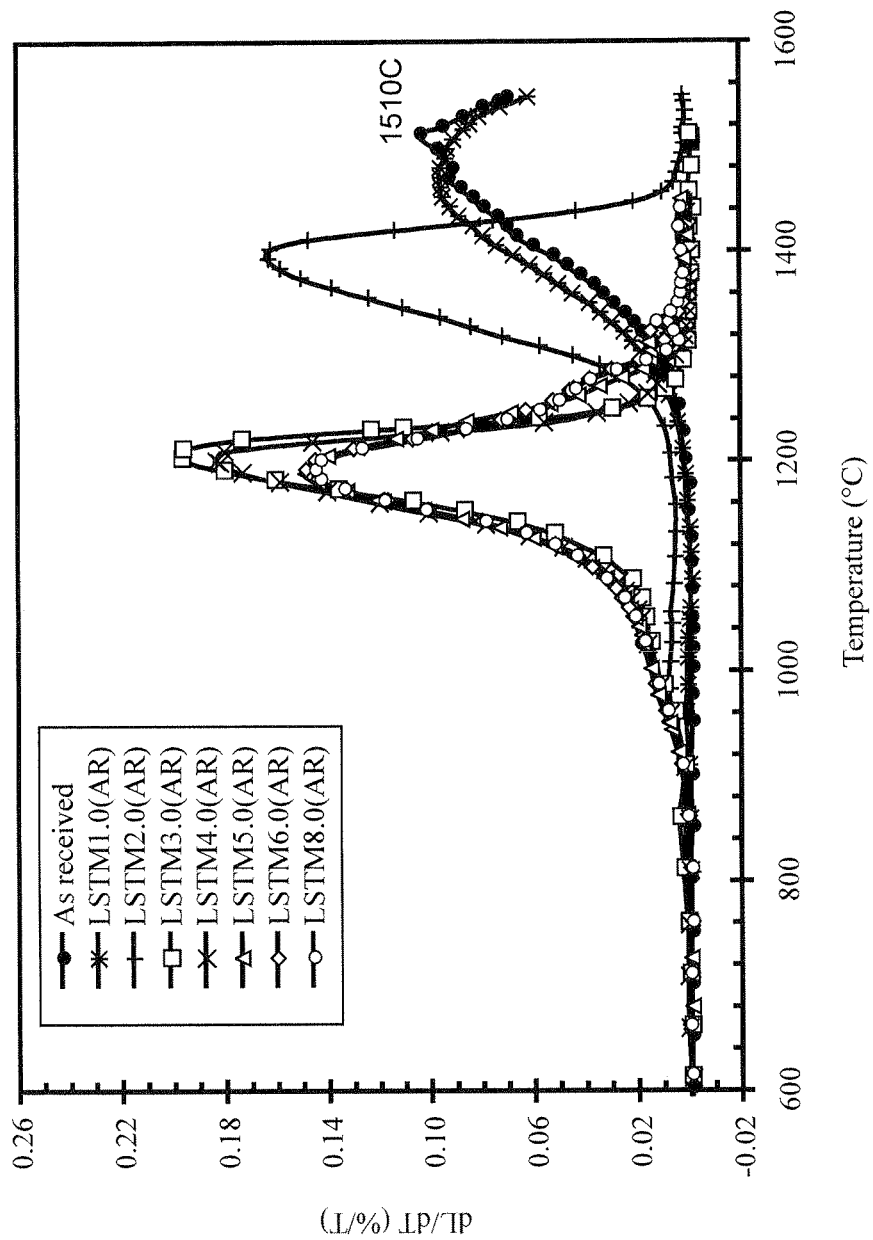
FIG. 5 is a graph of the shrinkage rate of $Mn_2O_3$-doped and as-received LST28 powder as measured by dilatometry.
Figure 6:
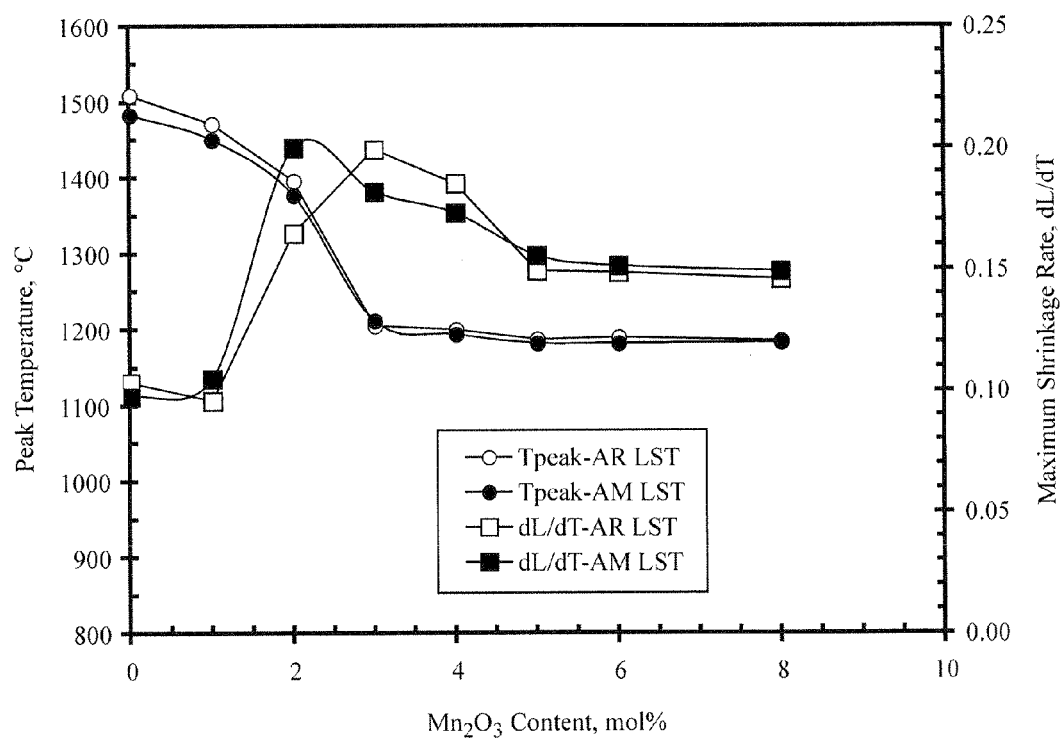
FIG. 6 is a graph of the peak temperatures and maximum shrinkage rates, $(dL/dT)_{max}$, from $Mn_2O_3$-doped attrition-milled LST28 and as-received LST28 shrinkage curves shown in FIG. 4 and FIG. 5.

Efforts in this subtask were devoted to making $Mn_2O_3$ doped LST28 powders both from attrition milled for 4 hrs and as-received LST28, and to the dilatometry measurement on all the mixtures. The $Mn_2O_3$ content was 1.0, 2.0, 3.0, 4.0, 5.0, 6.0, 8.0 mol % for both LST28 powders (AM and AR) and named as LSTM1.0(AM4 hrs), LSTM1.0(AR), LSTM8.0 (AM4 hrs), and LSTM8.0(AR), respectively. Their dilatometry results are shown in FIGS. 4-6. The results have shown that $Mn_2O_3$ doping erased the contribution of attrition milling. Both LSTM(AM4 hrs) and LSTM(AR) materials with the same $Mn_2O_3$ content have very similar free sintering behaviors: the $T_{peak}$ of the shrinkage curve of LST28 could be reduced sharply over 300° C. after doping 3.0 mol % $Mn_2O_3$, from 1,510° C. to 1,206° C. and it almost reached a saturation point with further doping. The $T_{peak}$ was just reduced 20° C. more after adding 5.0 mol % more $Mn_2O_3$, from 1,206° C. to 1,186° C.; however, the maximum shrinkage rate, $(dL/dT)_{max}$, increased sharply after doping 3 mol % $Mn_2O_3$, from 0.10 to 0.20, which is similar to an A-site deficiency LST28 sintering behavior as discussed below, since doping $Mn_2O_3$ would cause A-site deficiency in LST28 (Mn would diffuse into B-site in the Ti position during sintering.). Then the $(dL/dT)_{max}$ decreased to 0.15 with addition of $Mn_2O_3$ up to 5 mol % because other peaks in the shrinkage curve became stronger and stronger. But it could not be reduced further with increasing dopant because this effect was compensated by more and more A-site deficiency at the same time; the peak at about 1,000° C. when doping more than 1.0 mol % should be related to the melting point of $Mn_2O_3$ (1,080° C.). But the peak at about 1,300° C. when doping more than 3.0 mol % may be related to the structure change of LST28 because of Mn diffusion or Mn valence change.

$Nb_2O_5$ Doped as-Received LST28 and LST355

Figure 7:
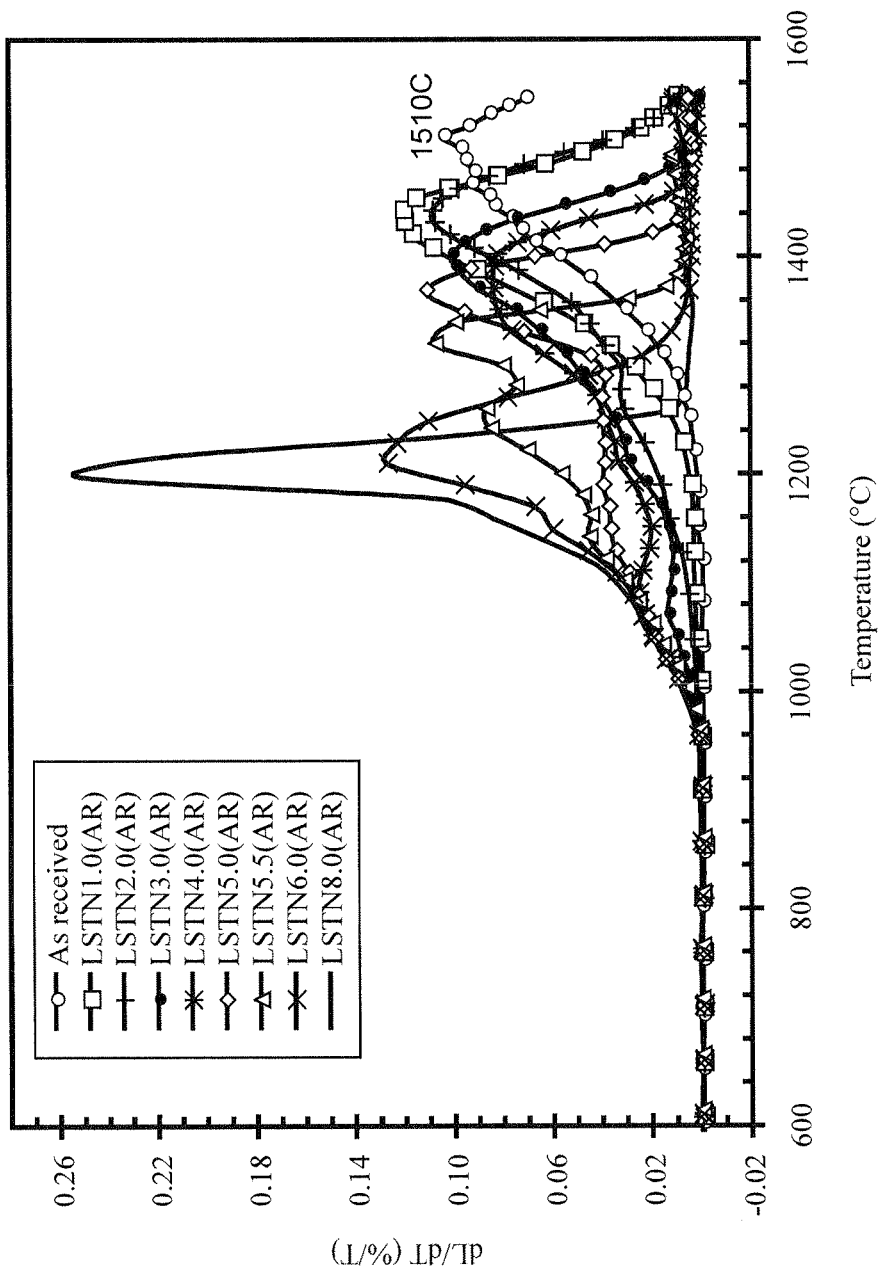
FIG. 7 is a graph of the shrinkage rate of $Nb_2O_5$-doped and as-received LST28 as measured by dilatometry.
Figure 8:
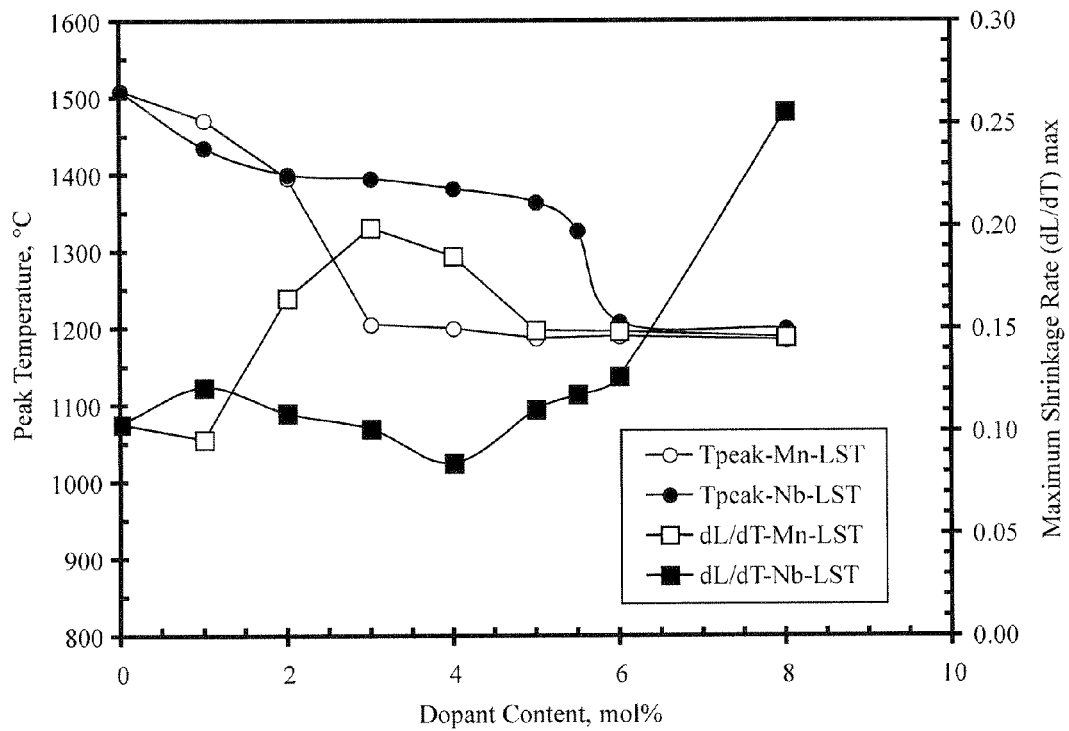
FIG. 8 is a graph of the peak temperatures and maximum shrinkage rates, $(dL/dT)_{max}$, from $Mn_2O_3$-doped LST28 and $Nb_2O_5$-doped LST28 shrinkage curves shown in FIG. 1.
Figure 9:
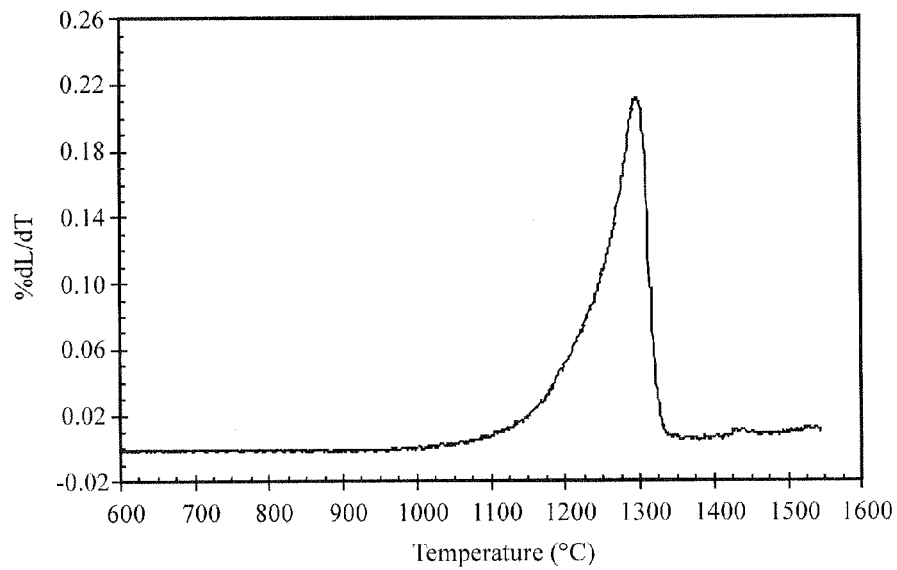
FIG. 9 is a graph of the shrinkage rate of an A-site deficiency LST355 ($La_{0.30}Sr_{0.55}TiO_3$) as measured by dilatometry.

The dopant selection was extended to $Nb_2O_5$ in this subtask. $Nb_2O_5$ has been selected because, like $La_{0.4}Sr_{0.6}Ti_{0.4}Mn_{0.6}O_3$, Nb doped $SrTiO_3$ (like $Sr_{0.9}Ti_{0.8}Nb_{0.2}O_3$) has lower sintering temperature and higher conductivity. T. Kolodiazhnyi and A. Petric, *The Applicability of Sr-deficient n-type SrTiO₃ for SOFC*, Journal of Electroceramics, 15 pp. 5-11 (2005). Only as-received LST28 was used as the baseline for $Nb_2O_5$ doping, because $Mn_2O_3$ doping erased the contribution of attrition milling. Therefore, efforts in this subtask were devoted to mixing $Nb_2O_5$-doped LST28 powders and to the dilatometry measurement on the mixtures. The $Nb_2O_5$ content was 1.0, 2.0, 3.0, 4.0, 5.0, 5.5, 6.0, and 8.0 mol % for doping as received LST28 powder and named as LSTN1.0(AR), LSTN2.0(AR), . . . and LSTN8.0(AR), respectively. Their dilatometry results are shown in FIGS. 7 and 8. FIG. 8 also shows the $T_{peak}$ and $(dL/dT)_{max}$ data of $Mn_2O_3$ doped as received LST28 for comparison. In $Mn_2O_3$ doped LST28, the $T_{peak}$ of the shrinkage curve of LST28 could be reduced sharply over 300° C. after doping 3.0 mol % $Mn_2O_3$, from 1,510° C. to 1,206° C. and it almost reached a saturation point with further doping. The $T_{peak}$ was just reduced 20° C. more after adding 5.0 mol % more $Mn_2O_3$, from 1,206° C. to 1,186° C.; however, the maximum shrinkage rate, $(dL/dT)_{max}$, increased sharply after doping 2 and 3 mol % $Mn_2O_3$, from 0.10 to 0.165 and 0.20, respectively, which were similar to an A-site deficiency $La_{0.30}Sr_{0.55}TiO_3$ (LST355) sintering behavior as shown in FIG. 9, since doping $Mn_2O_3$ would cause A-site deficiency in LST (Mn would diffuse into B-site in the Ti position during sintering.). Then the $(dL/dT)_{max}$ decreased to 0.15 if adding $Mn_2O_3$ up to 5 mol % because other peaks in the shrinkage curve became stronger and stronger. But it could not be reduced further with increasing dopant because this effect was compensated by more and more A-site deficiency at the same time; in $Nb_2O_5$ doped LST28, the free sintering behaviors were somehow different from the $Mn_2O_3$ doped LST28. The $T_{peak}$ of $Nb_2O_5$ doped LST28 was gradually reduced from 1,510° C. of as-received LST28 to 1,328° C. with 5.5 mol % $Nb_2O_5$-doped LST28 (in fact, there were three peaks in this shrinkage curve), then sharply to 1,209° C. with 6.0 mol % $Nb_2O_5$ doping. Further doping with 8.0 mol % $Nb_2O_5$ only reduced the $T_{peak}$ to 1,201° C. but increased the $(dL/dT)_{max}$ to a large number, 0.26, which is exactly like the sintering behavior of LST355 in FIG. 9. The $(dL/dT)_{max}$ of $Nb_2O_5$-doped LST28 is gradually reduced in the first 4 mol % $Nb_2O_5$ doping and increased gradually with 5~6 mol % $Nb_2O_5$ doping. But overall, it is much lower than that of the $Mn_2O_3$-doped LST28 except for the 8.0 mol % $Nb_2O_5$ doping. It is in the range of 0.085 to 0.127. All of the shrinkage curves of $Nb_2O_5$-doped LST28 are relatively asymmetric. They are relatively broad between the onset and the $T_{peak}$. A second peak and even a third peak have also been found in the curves from 1,000° C. to 1,300° C., depending on the dopant content. It was assumed above that the peak at about 1,000° C. in $Mn_2O_3$ doped LST should be related to the melting behavior of $Mn_2O_3$ (its melting point is 1,080° C.), and the peak at about 1,300° C. when doping more than 3.0 mol % might be related to the structure change of LST28 because of Mn diffusion or Mn valence change. There should be other reasons for the presence of the other peaks and the broadening in the shrinkage curves of $Nb_2O_5$-doped LST28, because the melting point of $Nb_2O_5$ is as high as 1,520° C., which will be studied by XRD below. The low $(dL/dT)_{max}$ and broad shrinkage curves on the onset side of $Nb_2O_5$-doped LST28 are ideal for co-densification with the electrolyte in SOFC stacks.

Coefficient of Thermal Expansions (CTE) and Chemical Expansions of Undoped and $Mn_2O_3$-, $Nb_2O_5$-Doped LST28

Efforts in this subtask were devoted to preparing dense bar samples of LST355 ($La_{0.30}Sr_{0.55}TiO_3$), $Mn_2O_3$-, $Nb_2O_5$-doped LST with selected compositions, and CTE and chemical expansion measurements. CTE and chemical expansion were measured by dilatometry under air, argon, and a forming gas (96% $N_2$+4% $H_2$), which will generate different oxygen partial pressures: 0.21 atm in air, and $4.0 \times 10^{-19}$ atm in the forming gas. All the doped LST powders were die-pressed into 6 mm×6 mm×30 mm bar samples in green form, and then sintered pressurelessly in air for one hour at different temperatures. The sintering temperature for each doped LST material was selected to be 50° C. higher than its $T_{peak}$ from the dilatometry curve to ensure to get fully dense bar samples after sintering. The Archimedes method revealed that the relative densities of all the sintered bar samples are >99%. The CTE and chemical expansion of selected $Mn_2O_3$-, $Nb_2O_5$-doped LST samples are summarized in Table 1 below and shown in FIGS. 10 and 11. The CTE of LST28 is almost stable with $Mn_2O_3$-doping up to 3 mol %, but decreases from 11.53 to $11.30 \times 10^{-6}$/K with 4.0 mol % $Mn_2O_3$ doping. However, $Nb_2O_5$ doping has a more significant effect on reducing the CTE of LST28 than $Mn_2O_3$ doping. The CTE of LST28 gradually decreases with $Nb_2O_5$ doping, from 11.53 to 11.0, then $10.6 \times 10^{-6}$/K with 2 mol % and 6.0 mol % $Nb_2O_5$ doping, respectively. Based on the thermal model, lowering the CTE of the ceramic interconnect (IC) will be favorable in reducing the thermal stress in the anode functional layer (AFL) which has been realized in $Nb_2O_5$ doping. The thermal stress in AFL will cause AFL cracking, and then IC cracking. Table 1 also shows that the CTE at 1,200° C. is higher than at 900° C. for both undoped LST28 and doped LST28 based on the incomplete data.

Figure 10:
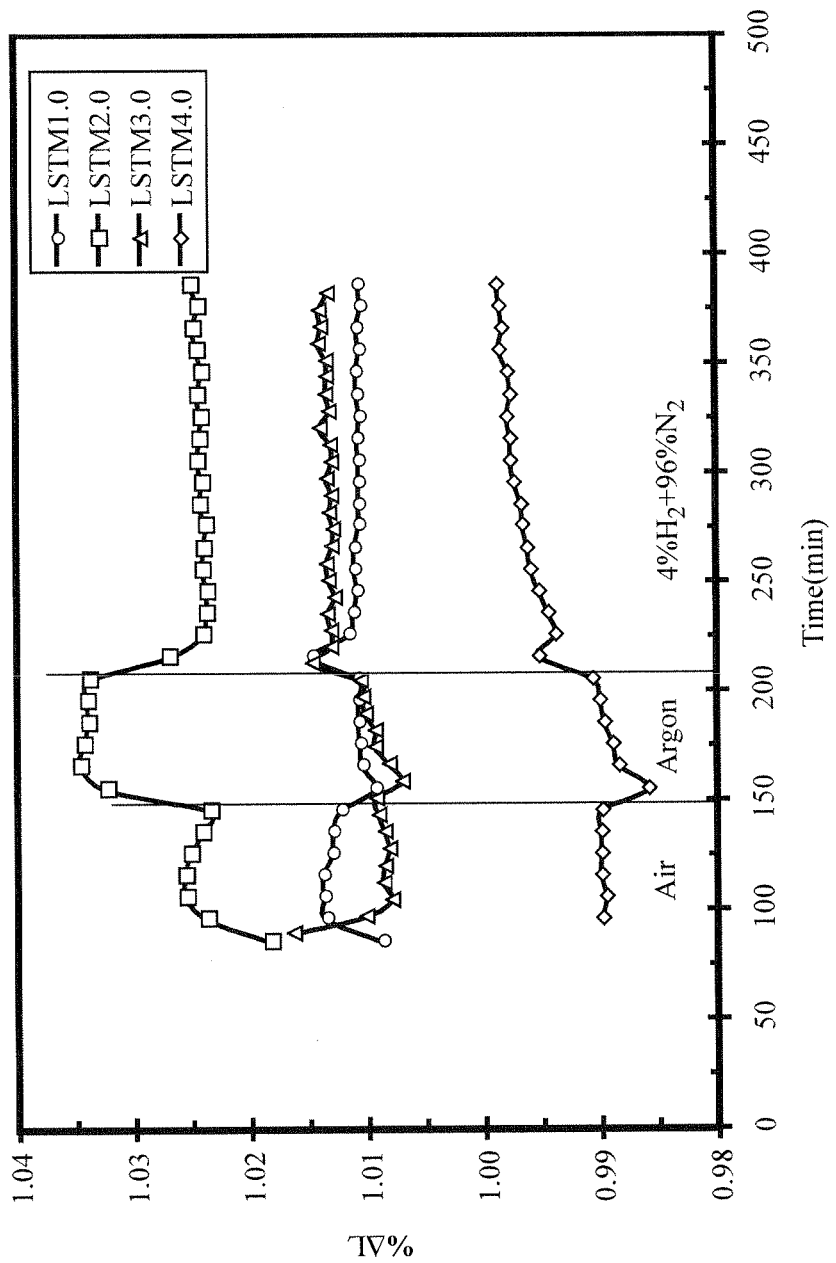
FIG. 10 is a graph of the chemical expansion of $Mn_2O_3$-doped LST28 measured by dilatometry.
Figure 11:
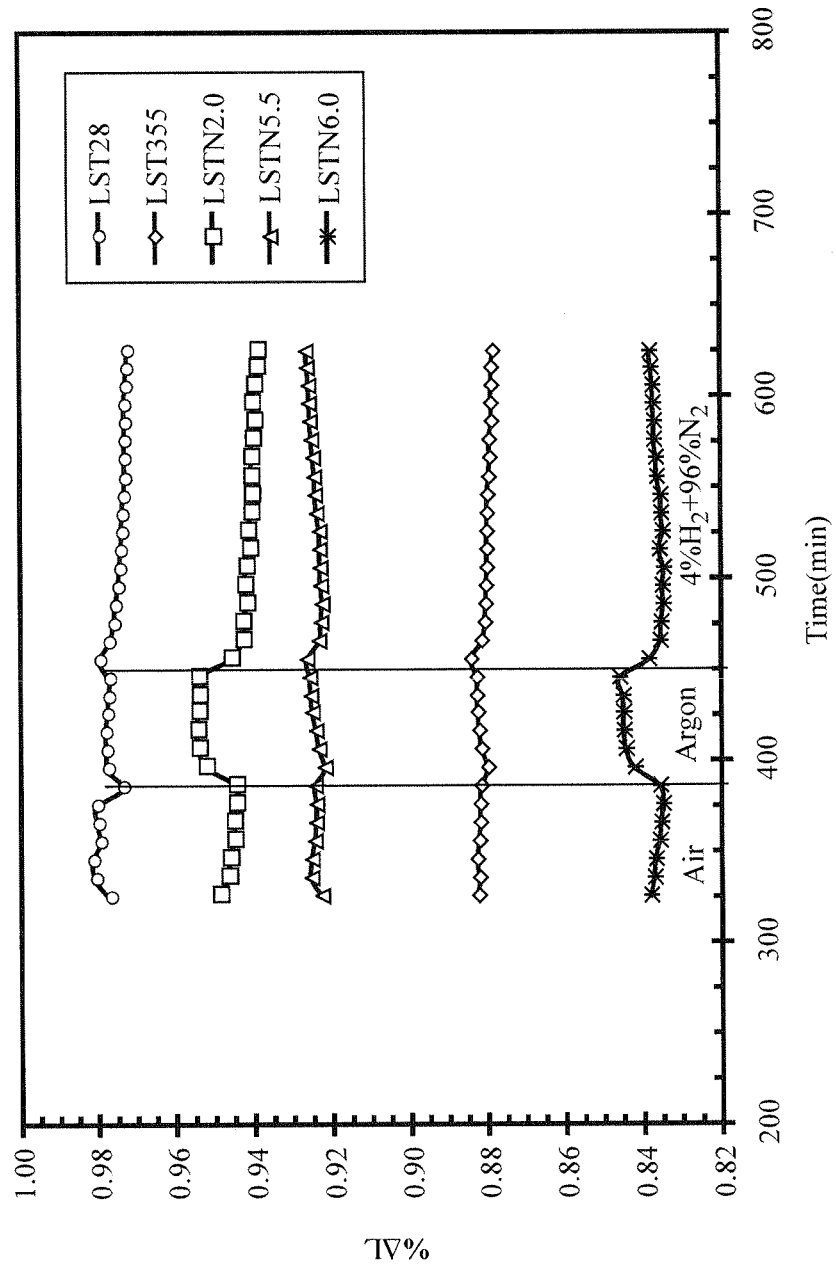
FIG. 11 is a graph of the chemical expansion of $Nb_2O_5$-doped LST28 and LST355 measured by dilatometry.

FIG. 10 and FIG. 11 show the chemical expansion of $Mn_2O_3$-doped LST28, LST355 and $Nb_2O_5$-doped LST in air for one hour, in argon for one hour, and in forming gas for three hours at 900° C. All these doped LST28 materials were very stable under the forming gas. The maximum expansion ($\Delta L/L_0$) that has been found in doped LST28 is 0.005% for LSTM4.0 (4.0 mol % $Mn_2O_3$ doped LST28) under the forming gas for three hours, which was much lower than LST28 (−0.01%) and lanthanum chromites (LSC and LCC) interconnects (0.15~0.35% literature data). It can be concluded that $Mn_2O_3$-, $Nb_2O_5$-doped LST28 materials are stable under forming gas for a limited time at 900° C.

TABLE 1

| | CTE of undoped and $Mn_2O_3$-, $Nb_2O_5$-doped LST28 | | | | | | | | |
|---|---|---|---|---|---|---|---|---|---|
| Material | LST28 | LST355 | LSTM1.0 | LSTM2.0 | LSTM3.0 | LSTM4.0 | LSTN2.0 | LSTN5.5 | LSTN6.0 |
| CTE at 900° C. ($10^{-6}$/K) | 11.53 | 10.6 | 11.54 | 11.6 | 11.6 | 11.3 | 11.0 | 11.0 | 10.6 |
| CTE at 1200° C. ($10^{-6}$/K) | 11.8 | | | | | | | 11.32 | 11.1 | 11.1 |

Electrical Conductivities of Undoped and $Mn_2O_3$-, $Nb_2O_5$-Doped LST28

Figure 12:
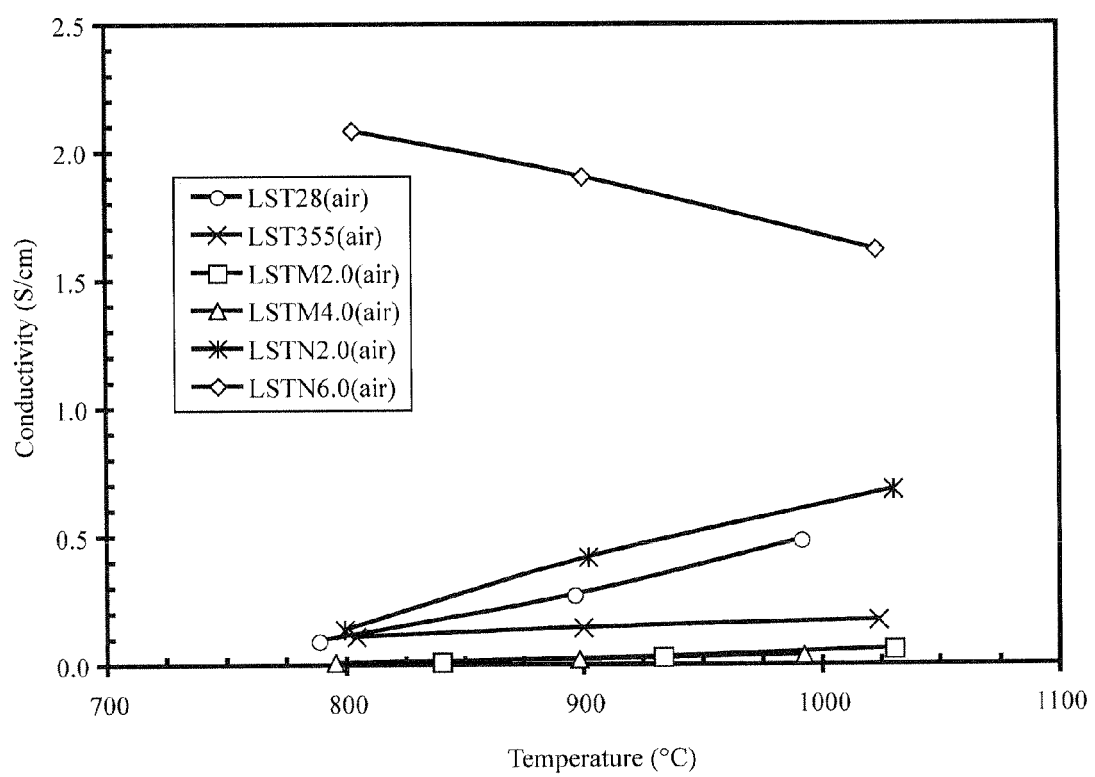
FIG. 12 is a graph of the electrical conductivity of $Mn_2O_3$- and $Nb_2O_5$-doped LST28 measured with a four-probe method in air. LST355 data are included in the figure for comparison. All samples were sintered at the same condition of 1,500° C. for 6 hrs.
Figure 13:
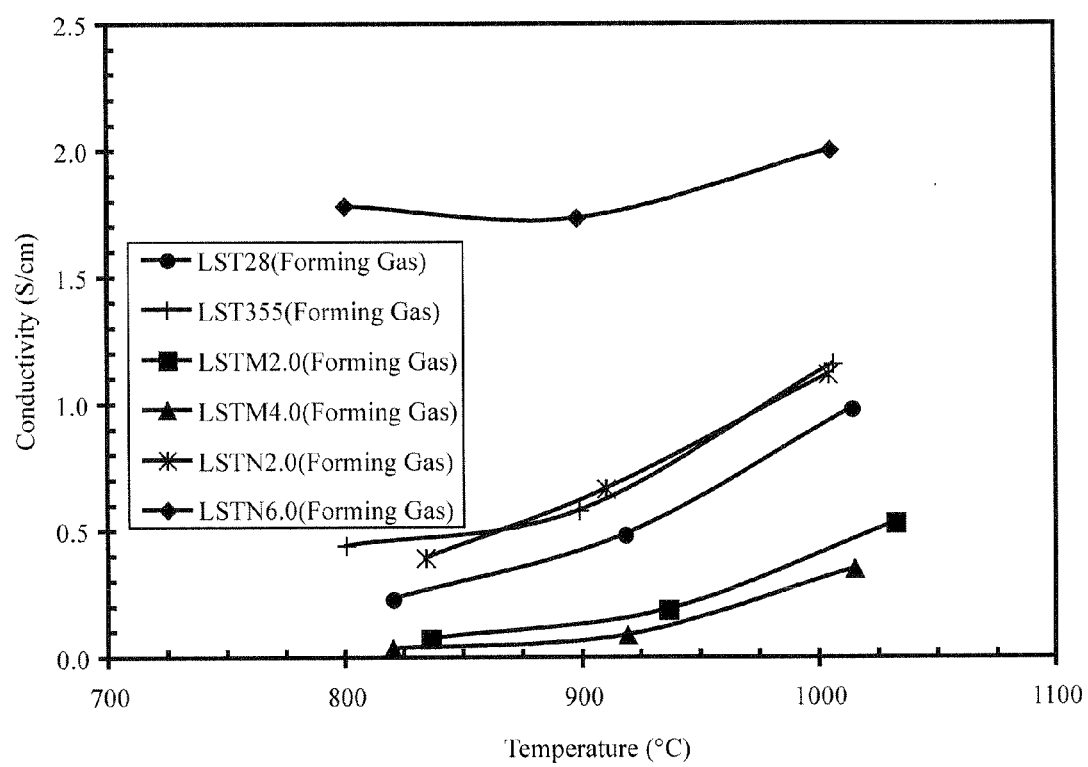
FIG. 13 is a graph of the electrical conductivity of $Mn_2O_3$- and $Nb_2O_5$-doped LST28 measured with a four-probe method in forming gas (96% $N_2$+4% $H_2$). LST355 data are included in the figure for comparison. All samples were sintered at the same condition of 1,500° C. for 6 hrs.
Figure 14A:
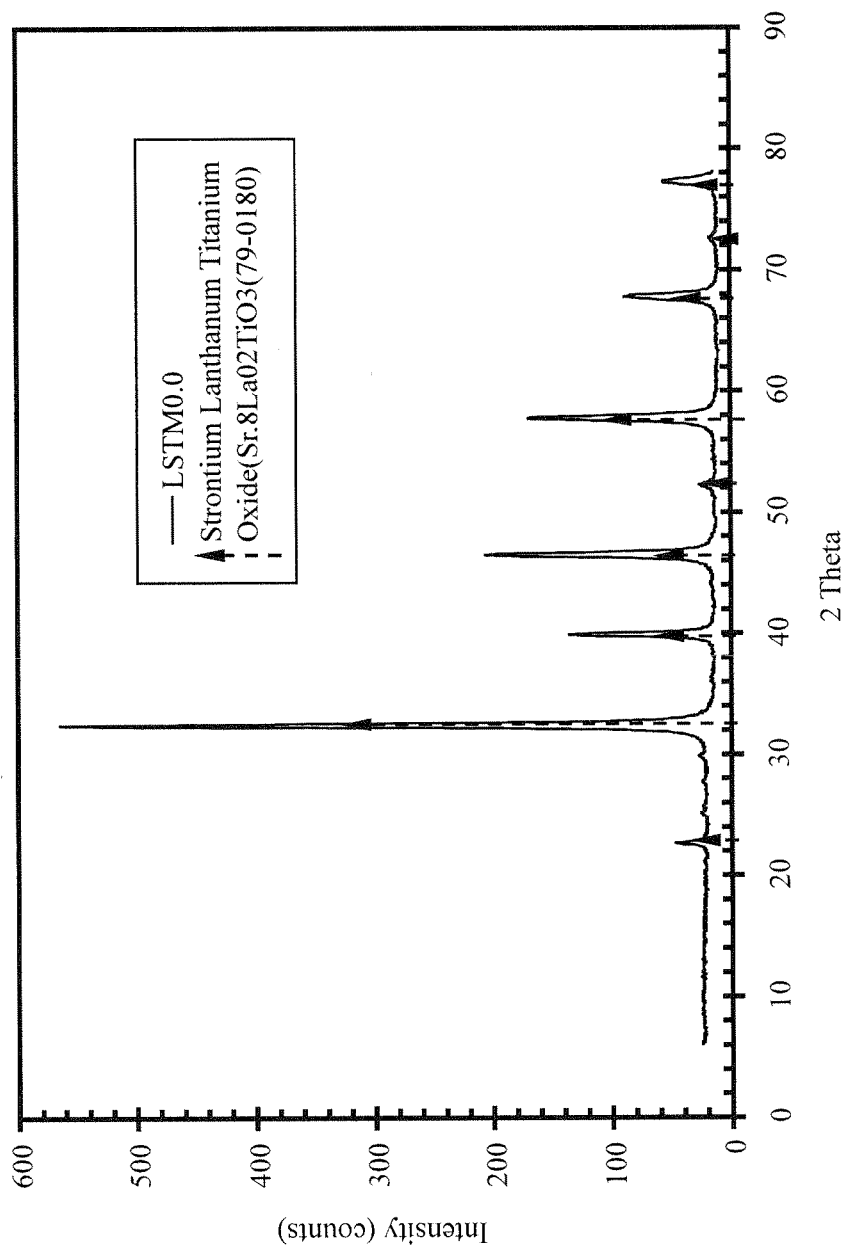
FIGS. 14A-E are graphs illustrating XRD patterns of powder mixtures.
Figure 14B:
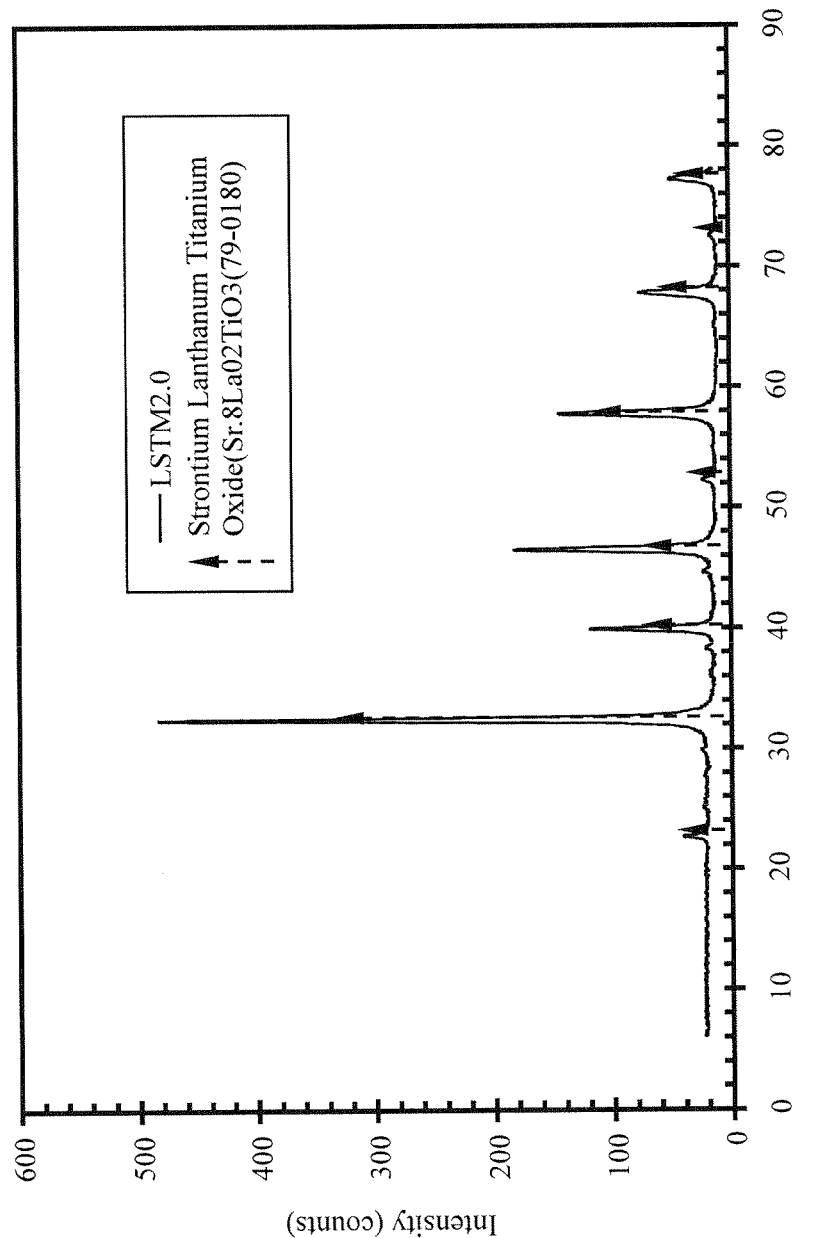
Figure 14C:
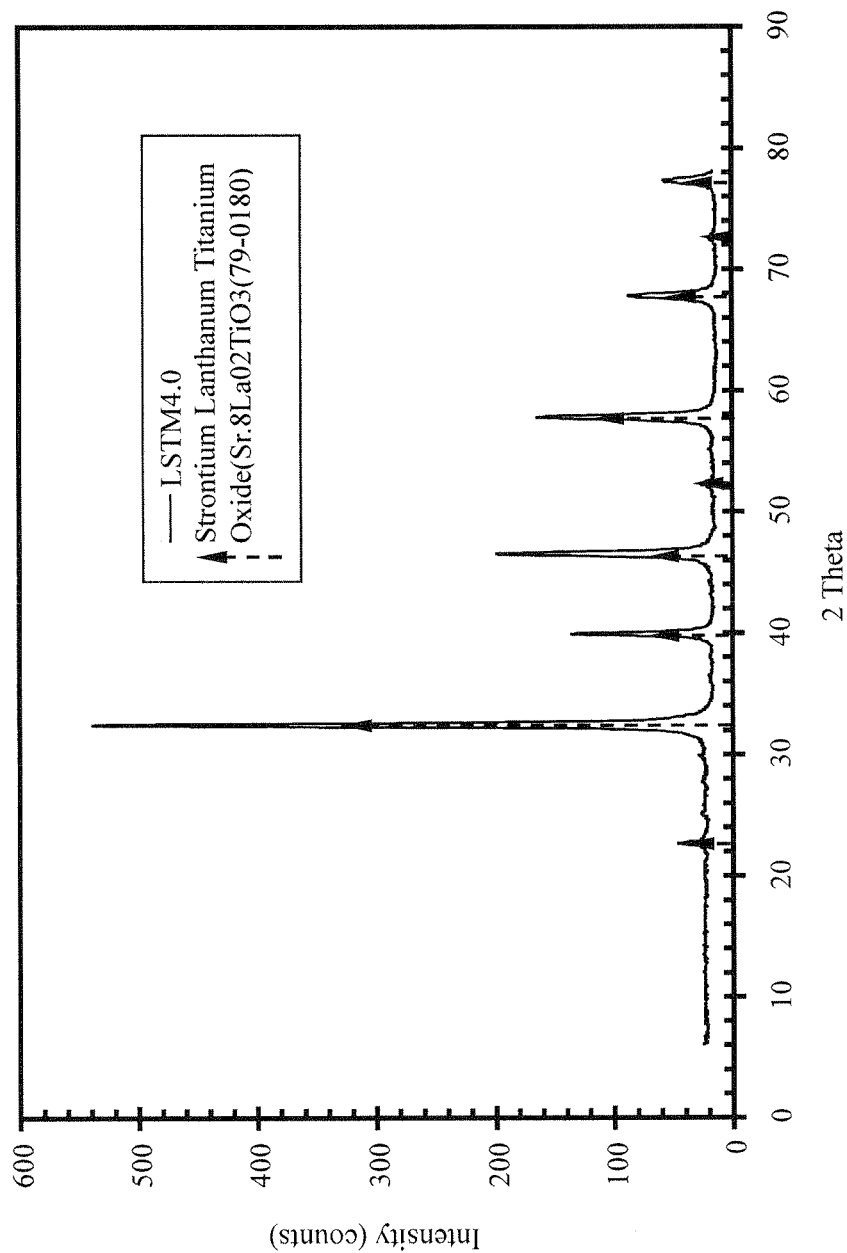
Figure 14D:
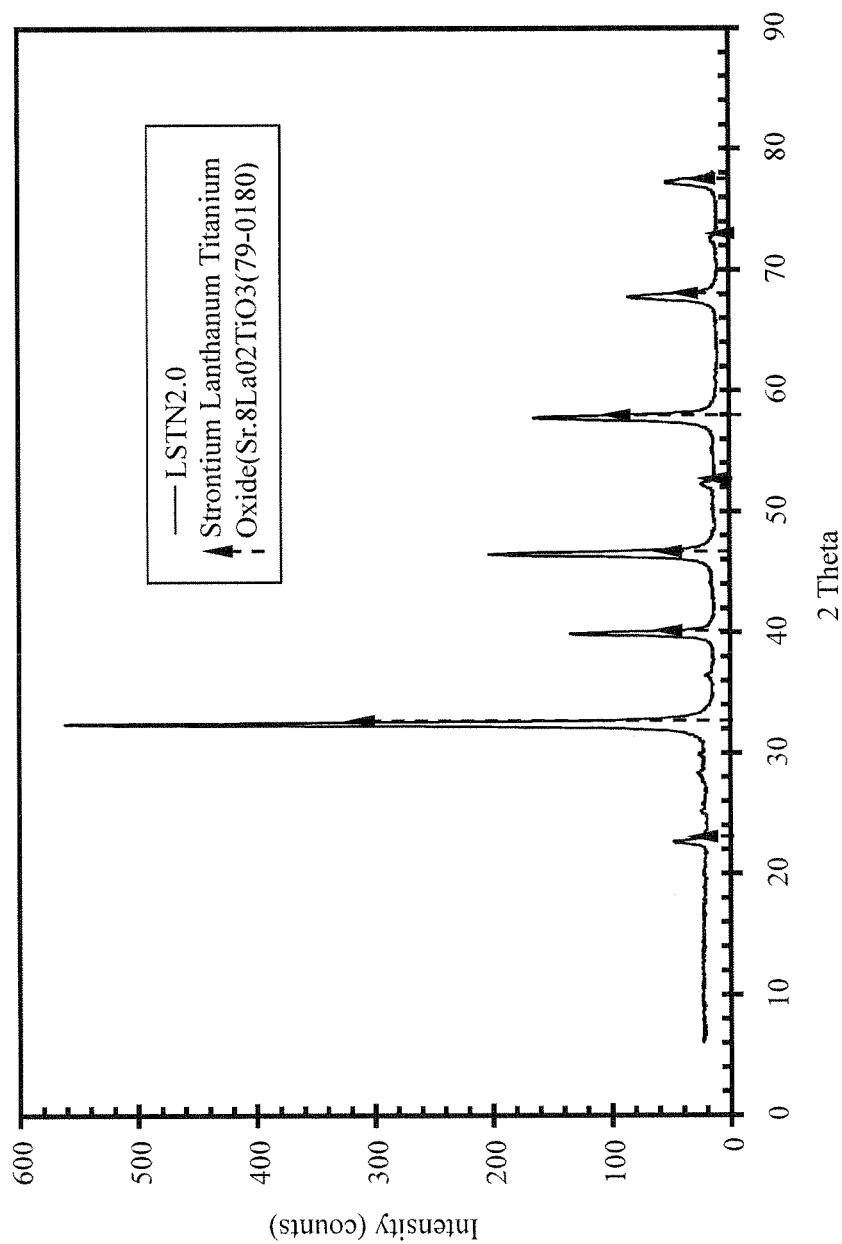
Figure 14E:
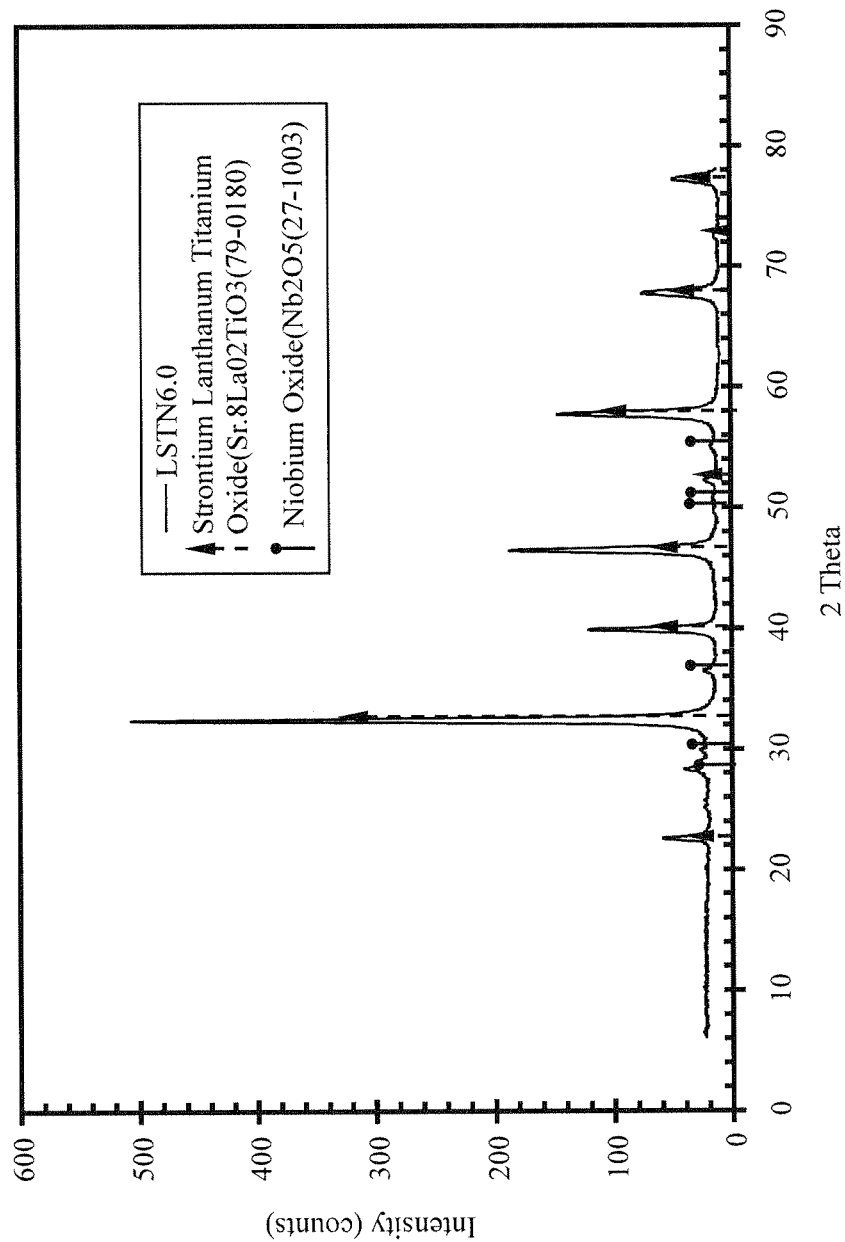
Figure 15A:
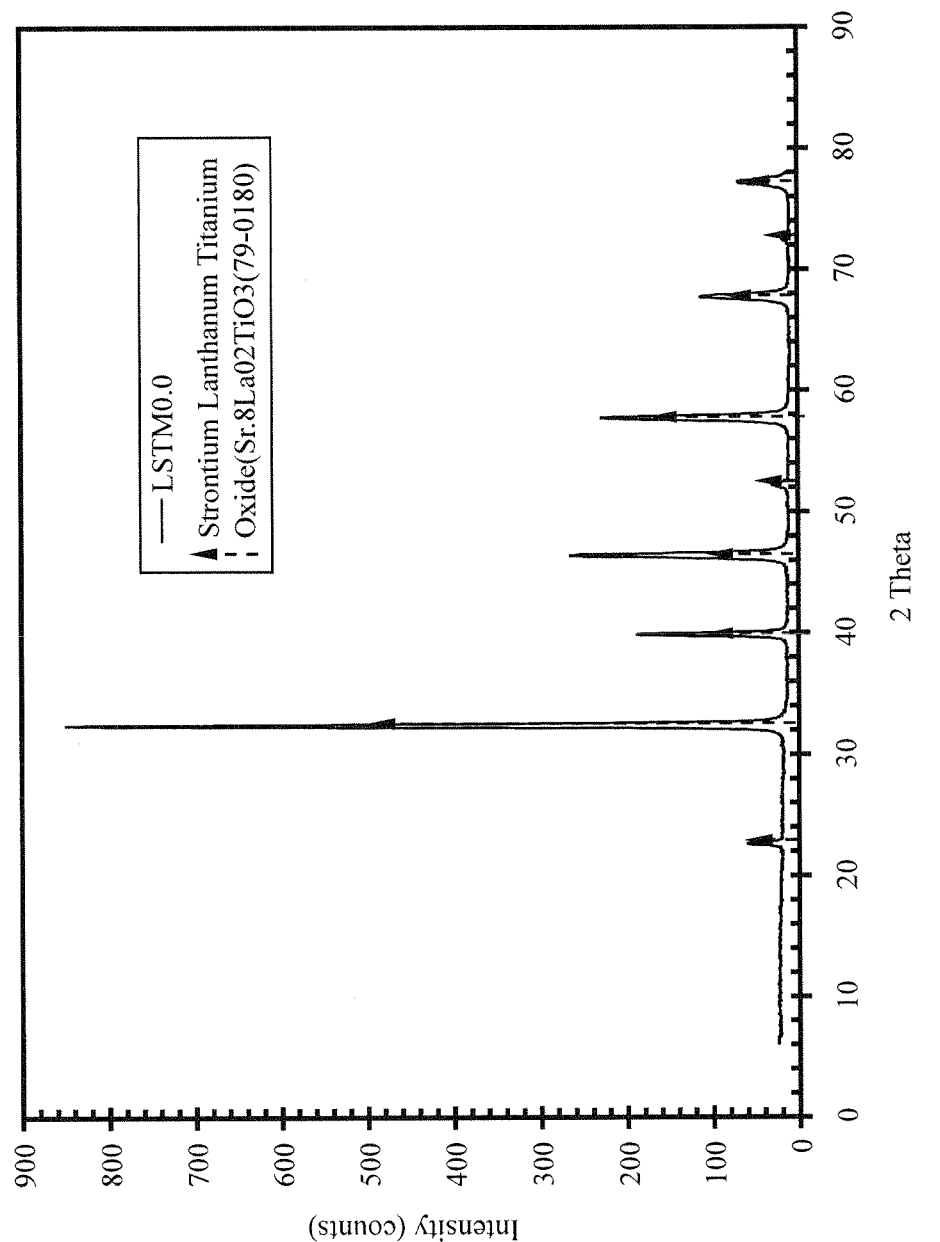
FIGS. 15A-F are graphs illustrating XRD patterns of undoped and doped LST28 samples (bar samples which were pressurelessly sintered at the same condition of 1,500° C. for 5 hrs.)
Figure 15B:
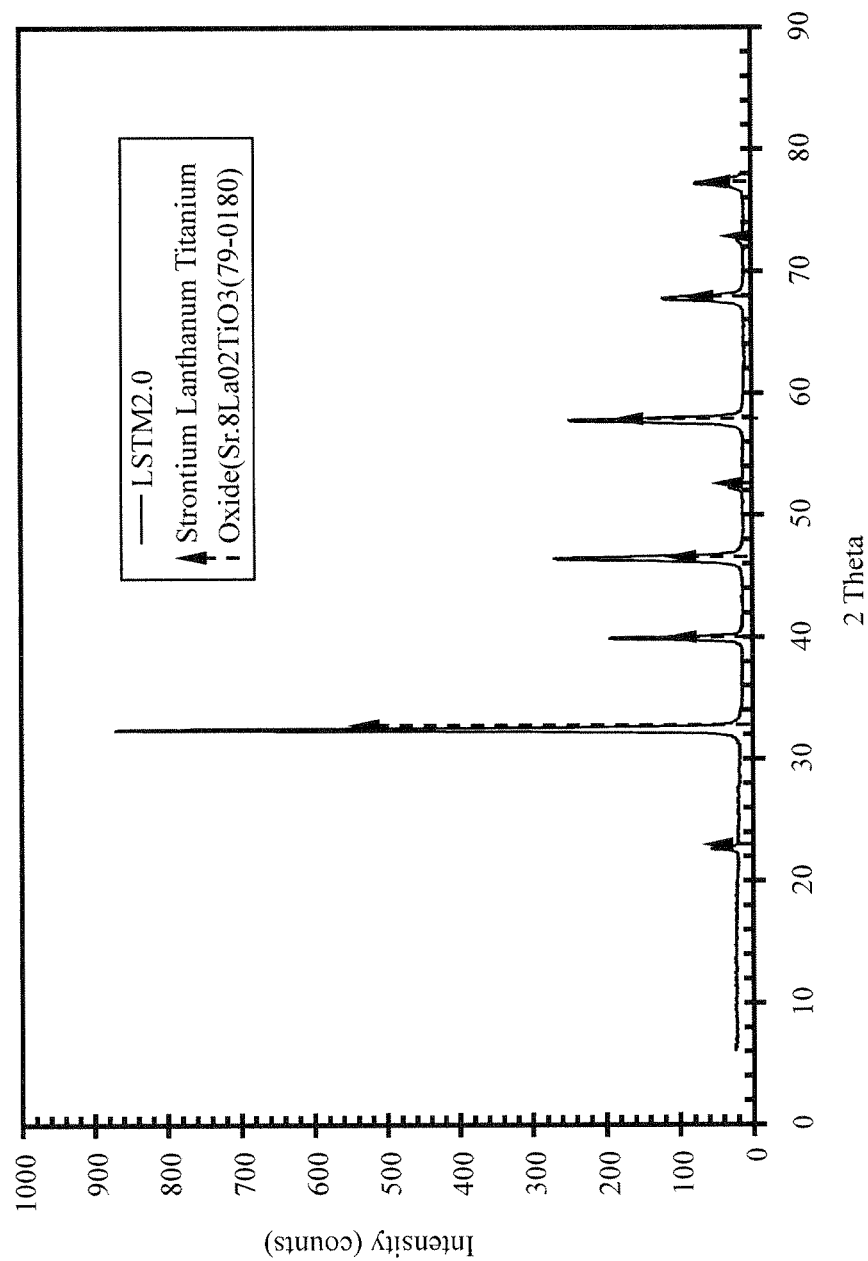
Figure 15C:
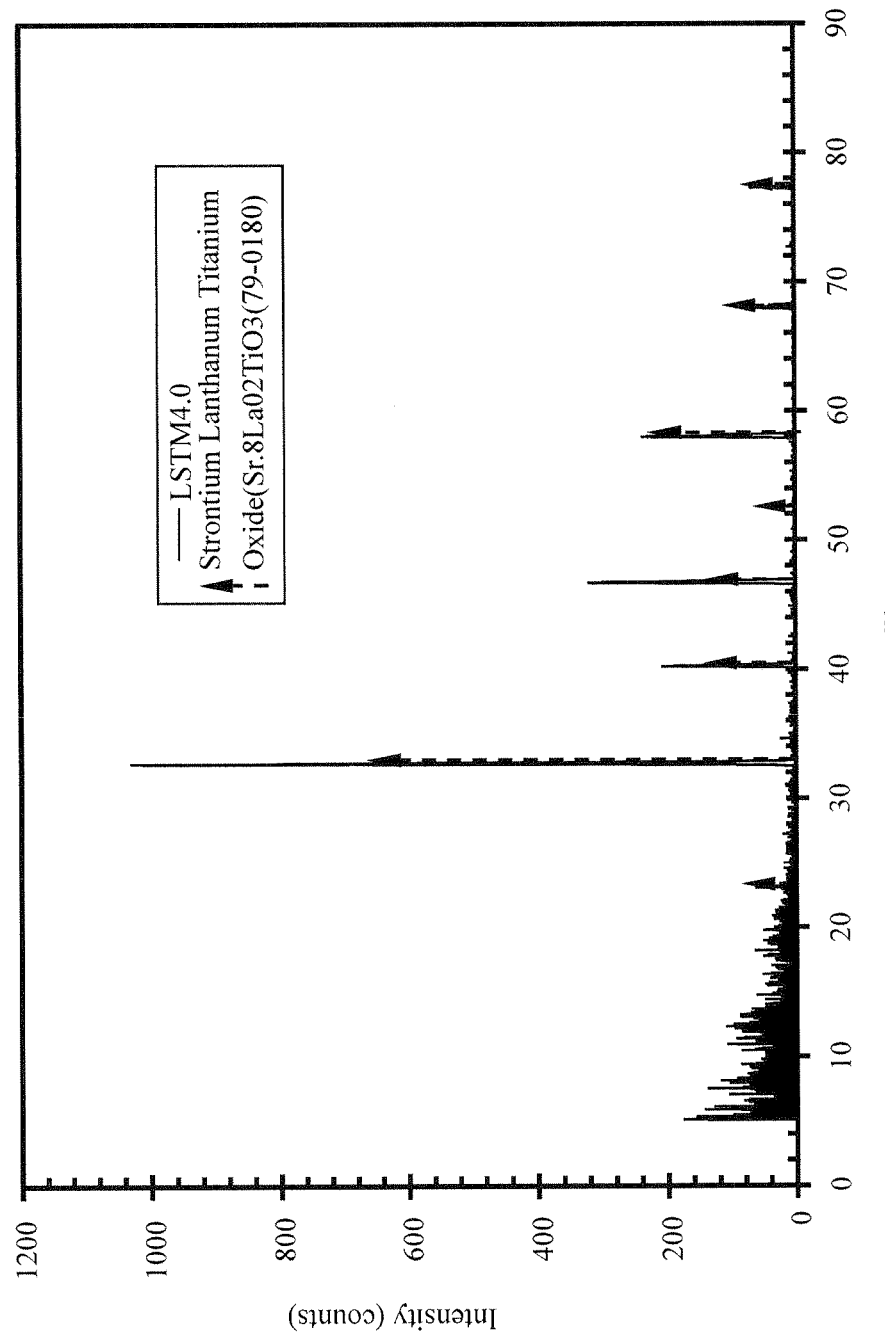
Figure 15D:
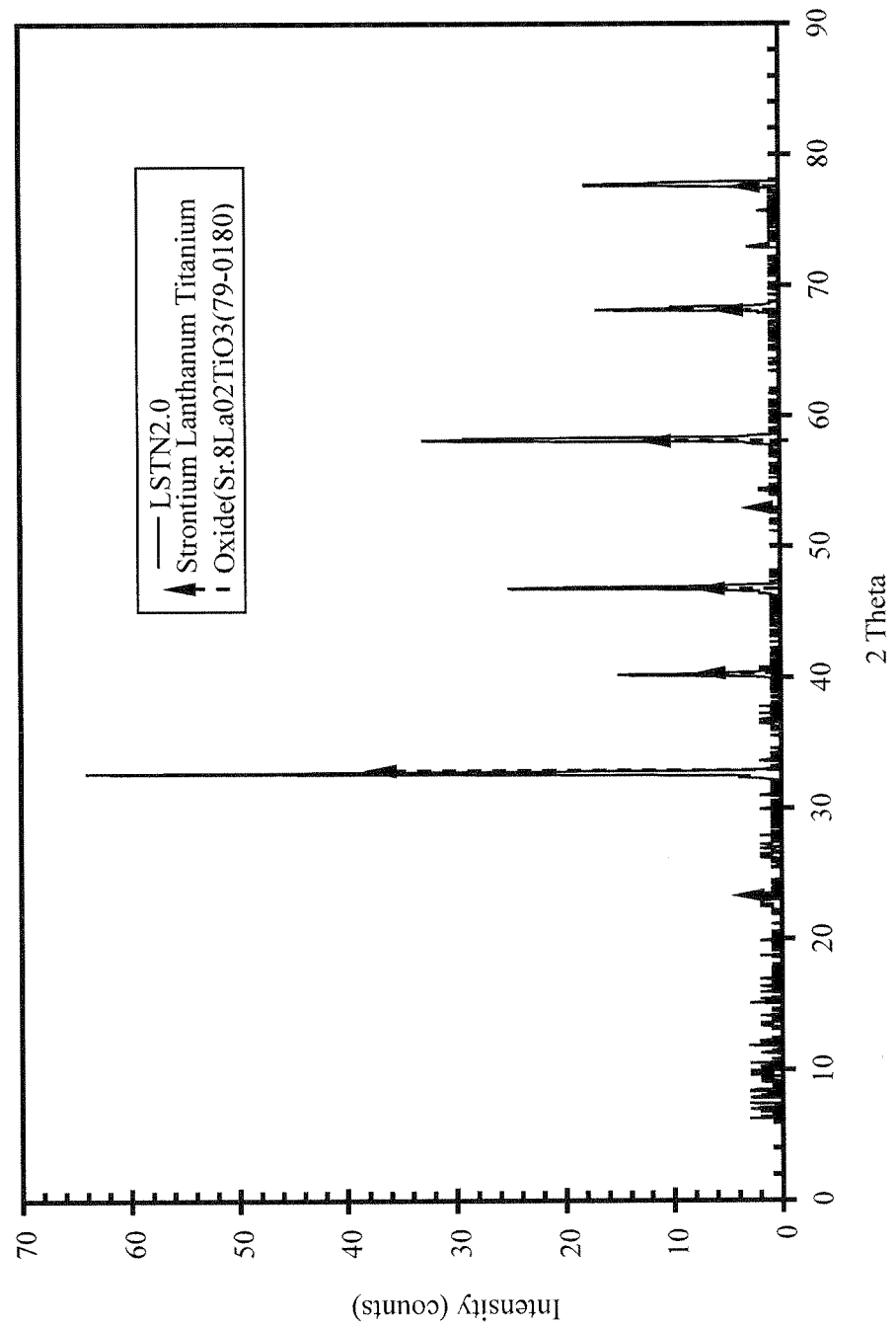
Figure 15E:
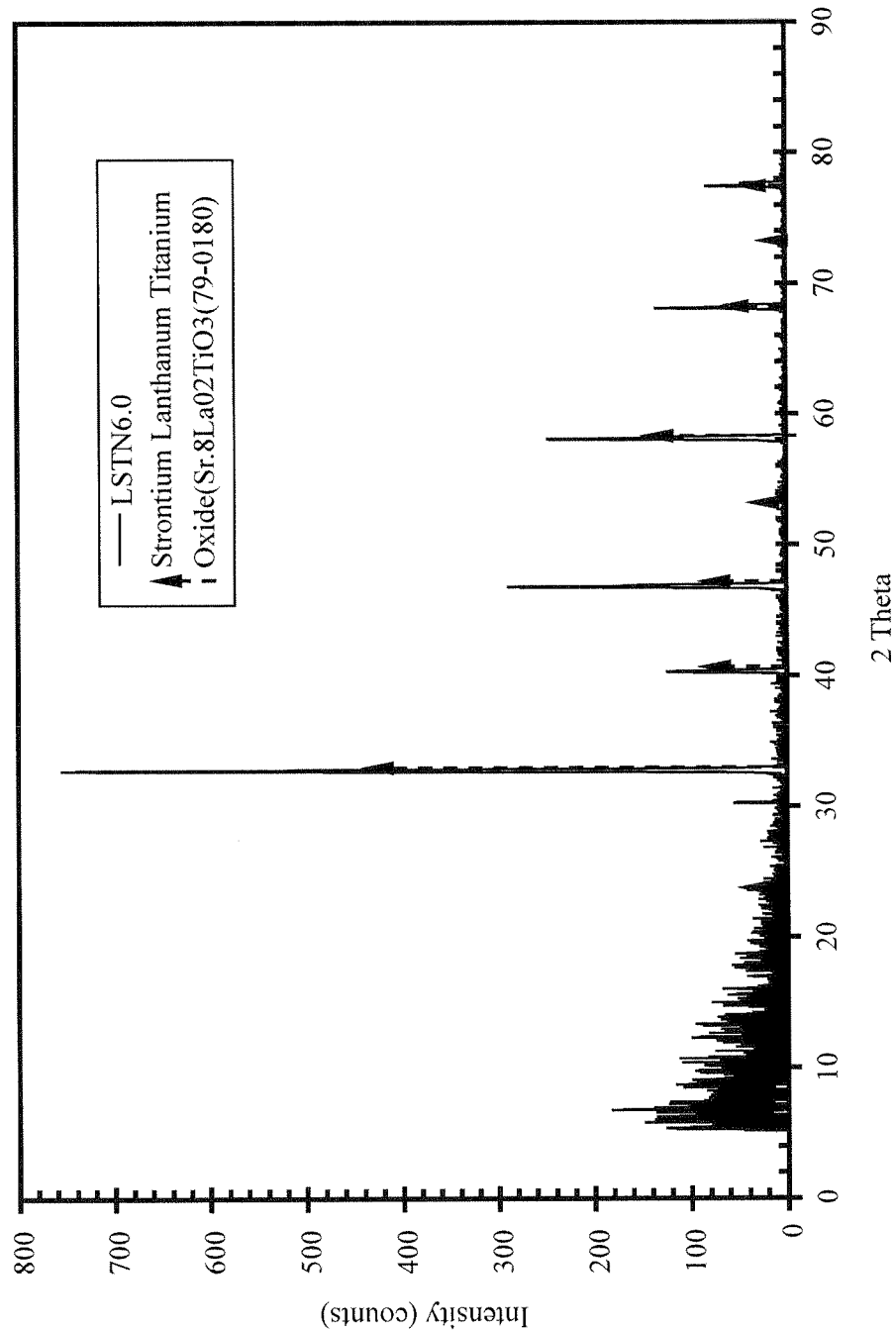
Figure 15F:
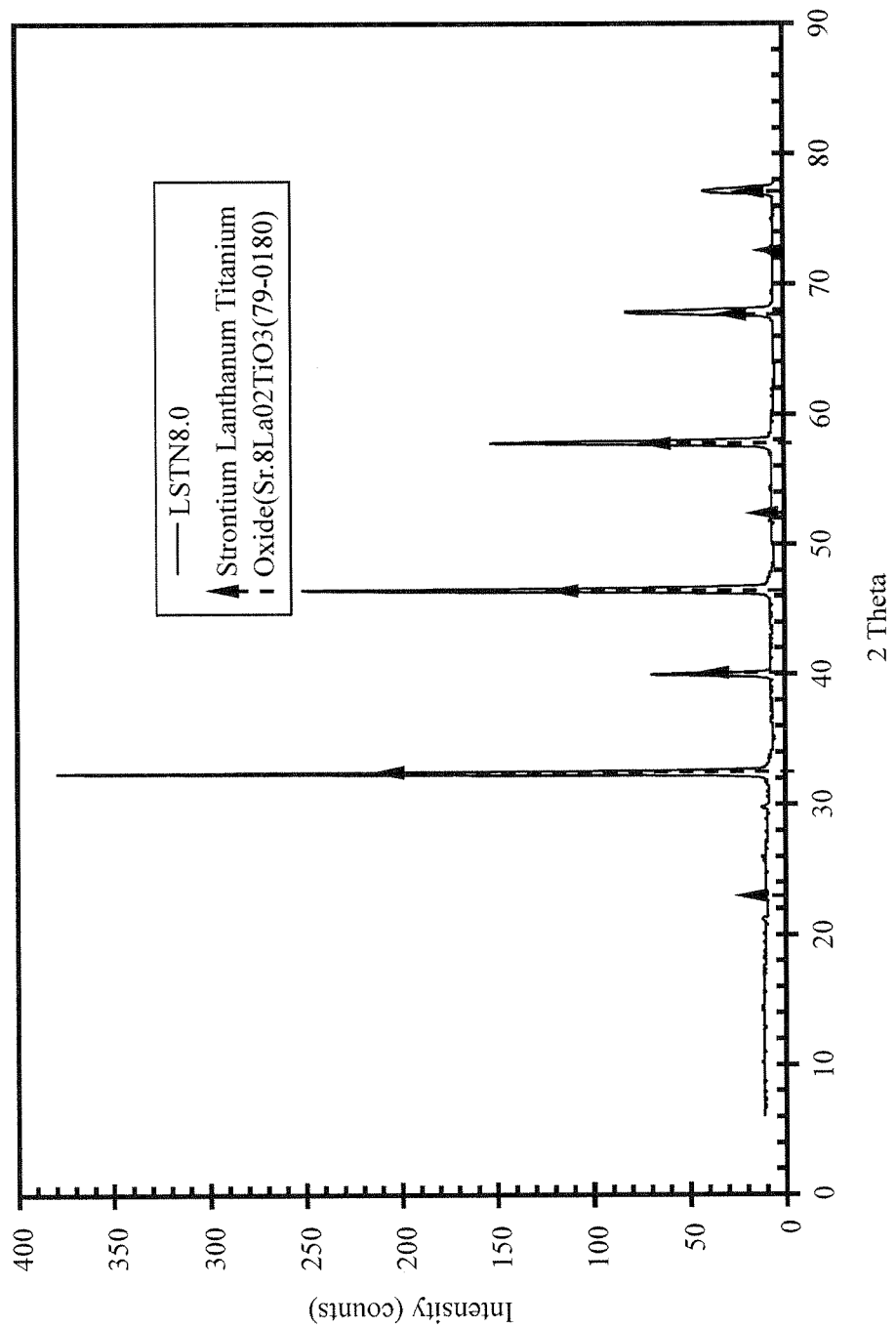

The electrical conductivities of undoped and doped LST28 samples should be compared with caution if the bar samples were sintered at different temperatures. The grain boundary in LST28 works as a high receptivity barrier so that LST28 samples with larger grain size when sintered at a higher temperature and a longer time will have higher values in conductivity. Also, the interstitial oxygen in LST28 might be easily removed under reducing conditions and therefore the reduction of $Ti^{4+}$ to $Ti^{3+}$ is favored. As a consequence, there is more $Ti^{3+}$ when tested under the forming gas, which explains the higher conductivities of all LST28 samples in forming gas than in air. There could also be more $Ti^{3+}$ in the samples when sintered at a higher temperature and longer time, which may explain why the conductivity of LST28 sample (sintered at 1,500° C. for 6 hrs in air and reduced in 96% $N_2$+4% $H_2$) is much lower than the literature data (sintered at 1,600° C. for 48 hrs, then reduced in 5% $H_2$/Ar at 1,000° C. for 48 hrs, 30 S/cm at 900° C. in wet 5% $H_2$/Ar). See J. Canales-Vazquez, S. W. Tao, and J. T. S. Irvine, *Electrical properties in $La_2Sr_4Ti_6O_{19-\delta}$: a potential anode for high temperature fuel cells*, Solid State Ionics 159 pp. 159-165 (2003). Therefore, new bar samples of the undoped LST and doped LST were sintered at the same condition (1,500° C. for 6 hrs) and their conductivities were measured, which eliminated the effects of sintering temperature. FIGS. 12 and 13 are the electrical conductivities of $Mn_2O_3$-doped LST, LST355, $Nb_2O_5$-doped LST and LST 28 measured in air and in forming gas at 800, 900, and 1,000° C., respectively.

The relative densities of the undoped LST (LST28 and LST355) and doped LST (LSTM2.0, LSTM4.0, LSTN2.0, and LSTN6.0) samples after sintered at 1,500° C. for 6 hrs are summarized in Table 2 below. They were at least over 95% of the theoretical density. Both LSTM4.0 and LSTN6.0 had lower relative densities because of their good sintering ability (lower $T_{peak}$ in the dilatometry curve), which meant that sintering at 1,500° C. for 6 hrs resulted in over-sintering, which yielded lower relative densities for these samples.

TABLE 2

Relative density of undoped and doped LST after sintered at 1,500° C. for 6 hrs

| Material | LST28 | LST355 | LSTM2.0 | LSTM4.0 | LSTN2.0 | LSTN6.0 |
|---|---|---|---|---|---|---|
| Relative density | 100% | 97.9% | 96.8% | 95.3% | 97.7% | 96.4% |

FIGS. 12 and 13 show the electrical conductivities of these samples in air and in forming gas, respectively, at 800, 900, and 1,000° C. All the data were the average of two samples. $Mn_2O_3$-doping reduced the conductivity of LST28 in both air and forming gas while $Nb_2O_5$-doping had an opposite effect on the conductivity of LST28. LSTN6.0 had the highest conductivity while LSTM4.0 had the lowest conductivity in both air and forming gas. The conductivity increased with temperature for all samples in air and in forming gas except that the conductivity of LSTN6.0 in air decreased with temperature, which is the behavior of a metallic material. But in forming gas, the conductivity of LSTN 6.0 decreased slightly with temperature from 800° C. to 900° C., then increased with temperature from 900° C. to 1,000° C. The A-site deficiency material, LST355, had higher conductivity in forming gas, but lower in air than LST28. Usually, doping a acceptor like $Mn^{3+}$ in the B-site (Ti-site) will decrease the conductivity of $SrTiO_3$ while doping a donor like $Nb^{5+}$ in the B-site (Ti-site) will increase the conductivity of $SrTiO_3$. XRD study on undoped and $Mn_2O_3$-, $Nb_2O_5$-doped LST28

Efforts in this subtask were devoted to XRD study on the undoped and doped LST28 ($La_{0.20}Sr_{0.80}TiO_3$, the baseline material for the doping study discussed above) samples before and after sintering. As mentioned above, there were other peaks appearing in the dilatomery curves from 1,000° C. to 1,300° C. when both $Mn_2O_3$ and $Nb_2O_5$ doping were more than 3.0 mol %. The dilatometry curves were fairly broad between the onset and the $T_{peak}$ in $Nb_2O_5$-doped LST28 samples. Therefore, room temperature XRD was conducted on the following selected samples before and after sintering to study the possible structure change during sintering: pure LST28 powder; 2 mol % $Mn_2O_3$+98 mol % LST28 powder mixture; 4 mol % $Mn_2O_3$+96 mol % LST28 powder mixture; 2 mol % $Nb_2O_5$+98 mol % LST28 powder mixture, and 6 mol % $Nb_2O_5$+94 mol % LST28 powder mixture, and their sintered bar samples: LSTM0.0, LSTM2.0, LSTM4.0, LSTN2.0, LSTN6.0, and LSTN8.0. All these samples were sintered in the same condition of 1,500° C. for 5 hrs. The XRD results are shown in FIG. 14 and FIG. 15 for the powder samples and sintered bar samples, respectively.

Figure 16A:
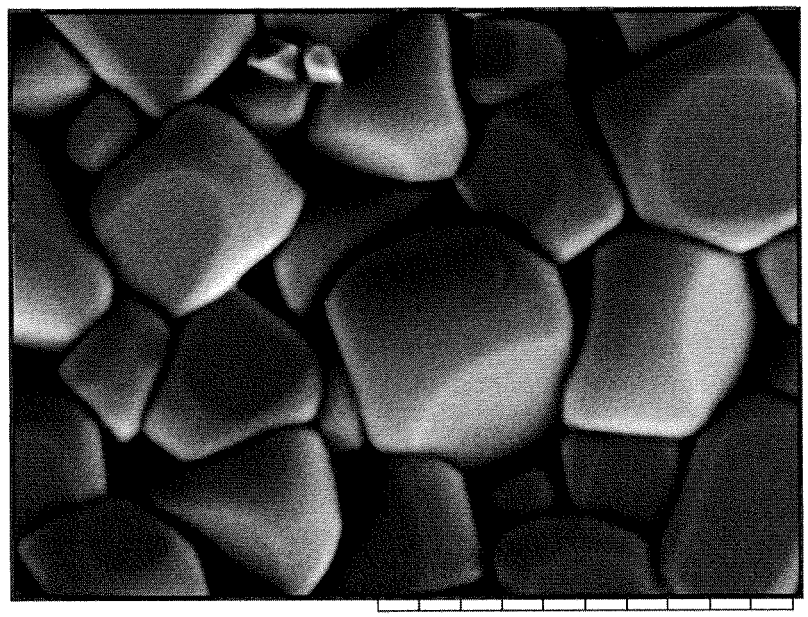
FIGS. 16A-B are SEM photographs of (FIG. 16A) LSTM4.0 surface and (FIG. 16B) LSTN8.0 surface after sintered at 1,500° C. for 6 hrs.
Figure 16B:
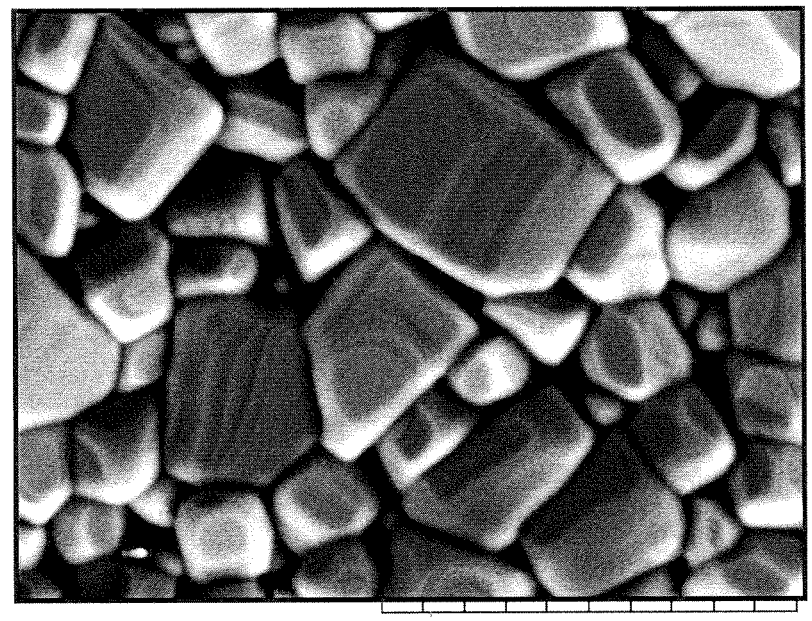

As shown in FIG. 14, neither $Mn_2O_3$ nor $Nb_2O_5$ was detected when the additive was not more than 4 mol % in the powder mixture. Only LST28 (cubic phase) patterns were apparent in FIG. 14(a), pure LST28 powder; FIG. 14(b), 2 mol % $Mn_2O_3$+98 mol % LST28 powder mixture; FIG. 14(c), 4 mol % $Mn_2O_3$+96 mol % LST28 powder mixture; and FIG. 14(d), 2 mol % $Nb_2O_5$+98 mol % LST28 powder mixture. But when the additive, $Nb_2O_5$, was increased to 6 mol %, $Nb_2O_5$ (orthorhombic phase), then patterns could be found in the XRD profiles of the powder mixture along with LST28 patterns in FIG. 14(e). After pressurelessly sintering at 1,500° C. for 5 hrs in air, LSTM0.0, LSTM2.0, LSTM4.0, and LSTN 2.0 remained single phase (LST28, cubic) patterns as shown by their XRD profiles in FIGS. 15(a), (b), (c) and (d), which were similar to their powder samples as shown in FIG. 14. The XRD patterns of $Nb_2O_5$ also disappeared in the sintered LSTN6.0 sample (FIG. 15(e)), and even in the sintered LSTN8.0 sample (FIG. 15(f), which indicated that the solubility of $Nb_2O_5$ in LST28 was at least 8 mol % when sintering at 1,500° C. The SEM results shown in FIG. 16 also indicated that there was no second phase in the surfaces of LSTM4.0 and LSTN8.0 samples after sintering at 1,500° C. for 6 hrs. However, there were other peaks appearing in the dilatomery curves from 1,000° C. to 1,300° C. when both $Mn_2O_3$ and $Nb_2O_5$ doping were more than 3.0 mol % and the dilatometry curves were fairly broad between the onset and the $T_{peak}$ in $Nb_2O_5$-doped LST28 samples.

CONCLUSIONS (1) The sintering temperature of LST28 could be significantly reduced by $Mn_2O_3$ doping or $Nb_2O_5$ doping. The $T_{peak}$ could be reduced by over 300° C. by doping with both $Mn_2O_3$ and $Nb_2O_5$.
(2) $Mn_2O_3$-doping had more effect on reducing $T_{peak}$ and increasing $(dL/dT)_{max}$ than $Nb_2O_5$-doping in the range of 1~5 mol % dopant contents; but at high dopant content, both dopants had a similar effect.
(3) Doping erased the contribution of attrition milling in reducing the sintering temperature of LST28.
(4) A-site deficiency LST355 had a lower sintering temperature.
(5) There was no phase change in LST28 for both dopings with content up to 8 mol % after sintering.
(6) $Mn_2O_3$-, $Nb_2O_5$-doped LST materials were stable under forming gas at 900° C.
(7) $Nb_2O_5$-doping increased the conductivity of LST28 but $Mn_2O_3$-doping had the opposite effect. $Nb_2O_5$-doped LST28 had a higher conductivity than that of $Mn_2O_3$-doped LST28.
(8) Three materials, LSTN6.0 (6.0 mol % $Nb_2O_5$ doped LST28), LSTM2.0 (2.0 mol % $Mn_2O_3$ doped LST28, and LST355, have been selected as the interconnect material.

Figure 18:
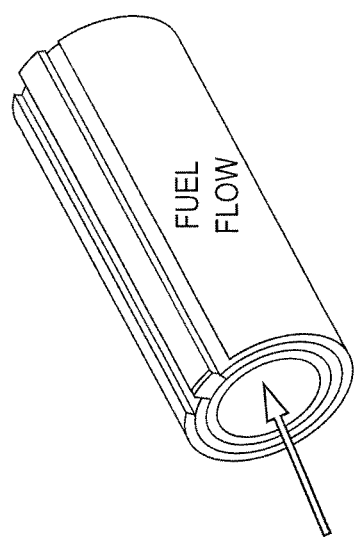
FIG. 18 is a schematic diagram of a fuel cell of the invention in a tubular design.
Figure 17:
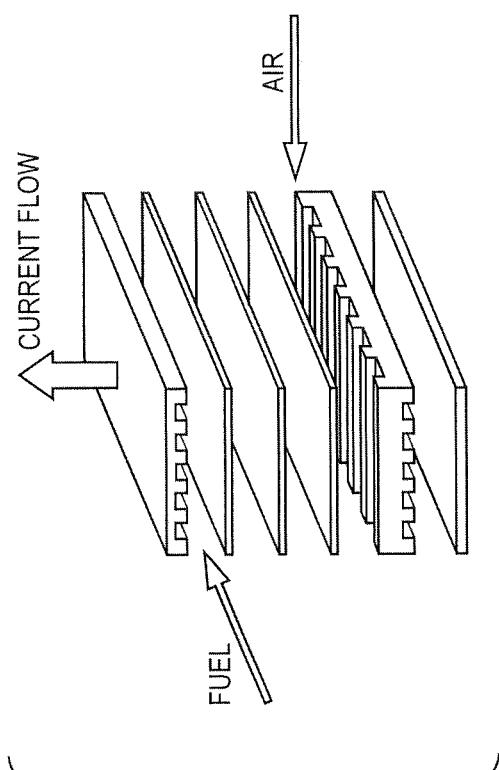
FIG. 17 is a schematic diagram of a fuel cell of the invention in a planar, stacked design.

The invention can be used as interconnects in fuel cells, $SrTiO_3$ varistors, and $SrTiO_3$ capacitors. A fuel cell of the invention can be a planar stacked fuel cell, as shown in FIG. 17. Alternatively, as shown in FIG. 18, a fuel cell of the invention can be a tubular fuel cell. Typically, in the planar design, as shown in FIG. 17, the components are assembled in flat stacks, with air and fuel flowing through channels built into the interconnect. Typically, in the tubular design, as shown in FIG. 18, the components are assembled in the form of a hollow tube, with the cell constructed in layers around a tubular cathode; air flows through the inside of the tube and fuel flows around the exterior.

The teachings of all patents, published applications and references cited herein are incorporated by reference in their entirety.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. A method of forming a solid oxide fuel cell, comprising the steps of:
   a) combining a lanthanum-doped strontium titanate (LST) with a compound including Mn or a compound including Nb to form a precursor interconnect composition;
   b) combining the precursor interconnect composition with a precursor cathode layer of a solid oxide fuel cell; and
   c) sintering the precursor interconnect composition and the precursor cathode layer to form an interconnect and a cathode, wherein the interconnect is in direct contact with the cathode and has a theoretical density of greater than about 95%, and wherein Mn or Nb is a dopant to replace Ti within the lanthanum-doped strontium titanate and the amount of the compound including Mn or the compound including Nb present in the precursor composition is sufficient to cause the precursor composition to be sintered to the theoretical density of greater than about 95% at a temperature in a range of 1,200° C. to 1,350° C.

2. The method of claim 1, wherein the amount of the compound including Mn or the compound including Nb present in the precursor composition is in a range of between about 1 mol % and about 8 mol %.

3. The method of claim 1, wherein the lanthanum-doped strontium titanate has an A-site deficient perovskite structure.

4. The method of claim 1, wherein the lanthanum-doped strontium titanate is further doped with Nb.

5. The method of claim 1, wherein the lanthanum-doped strontium titanate is further doped with Mn.

6. A solid oxide fuel cell, comprising:
   an anode;
   a cathode;
   an interconnect layer disposed between the anode and cathode, the interconnect layer including a lanthanum-doped strontium titanate (LST) doped with Mn or Nb in an amount in a range of between about 2 mol % and about 16 mol % and having a theoretical density of greater than about 95%; and
   an interface layer disposed between the interconnect layer and the anode,
   wherein the interconnect layer is in direct contact with the cathode.

7. The solid oxide fuel cell of claim 6, wherein the lanthanum-doped strontium titanate is doped with Nb.

8. The solid oxide fuel cell of claim 6, wherein the lanthanum-doped strontium titanate is doped with Mn.

9. The solid oxide fuel cell of claim 6, wherein the solid oxide fuel cell is a planar stacked fuel cell.

10. The solid oxide fuel cell of claim 6, wherein the interface layer comprises an A-site deficient material.

11. The solid oxide fuel cell of claim 10, wherein the A-site deficient material has a greater conductivity in forming gas as compared to air.

12. The solid oxide fuel cell of claim 6, wherein the interconnect includes a multilayer structure.

13. A solid oxide fuel cell, comprising:
   an anode;
   a cathode; and
   an interconnect layer including a lanthanum-doped strontium titanate (LST) doped with Mn or Nb in an amount of between about 2 mol % and about 16 mol %,
   wherein the interconnect layer is in direct contact with the cathode, and an interface layer is disposed between the anode and the interconnect layer.

14. The solid oxide fuel cell of claim 13, wherein the lanthanum-doped strontium titanate is an A-site deficient perovskite.

15. The solid oxide fuel cell of claim 13, wherein the lanthanum-doped strontium titanate is doped with Nb.

16. The solid oxide fuel cell of claim 13, wherein the lanthanum-doped strontium titanate is doped with Mn.

17. The solid oxide fuel cell of claim 13, wherein an electrolyte layer is disposed between the cathode and the anode.

* * * * *